US012570083B2

(12) United States Patent
Midorikawa et al.

(10) Patent No.: US 12,570,083 B2
(45) Date of Patent: Mar. 10, 2026

(54) LAMINATING SYSTEM

(71) Applicants: Ruki Midorikawa, Kanagawa (JP); Kazuki Shimodate, Kanagawa (JP); Yuichiro Kato, Kanagawa (JP); Naoki Takai, Tokyo (JP); Sho Asano, Kanagawa (JP); Yosuke Saito, Kanagawa (JP)

(72) Inventors: Ruki Midorikawa, Kanagawa (JP); Kazuki Shimodate, Kanagawa (JP); Yuichiro Kato, Kanagawa (JP); Naoki Takai, Tokyo (JP); Sho Asano, Kanagawa (JP); Yosuke Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 127 days.

(21) Appl. No.: 18/528,609

(22) Filed: Dec. 4, 2023

(65) Prior Publication Data

US 2024/0190121 A1    Jun. 13, 2024

(30) Foreign Application Priority Data

Dec. 9, 2022    (JP) ................................. 2022-197001

(51) Int. Cl.
$\quad$ B32B 37/18 $\qquad$ (2006.01)
$\quad$ B32B 37/00 $\qquad$ (2006.01)
$\quad$ B32B 38/18 $\qquad$ (2006.01)

(52) U.S. Cl.
$\quad$ CPC ............ B32B 37/185 (2013.01); B32B 38/18 (2013.01); *B32B 2037/0061* (2013.01)

(58) Field of Classification Search
$\quad$ CPC .................. B32B 37/185; B32B 38/18; B32B 2037/0061; B32B 37/06; B32B 37/10;
$\qquad$ (Continued)

(56) References Cited

U.S. PATENT DOCUMENTS

2002/0117266 A1* 8/2002 Han ...................... B32B 37/226
$\qquad$ 156/583.1
2020/0247636 A1 8/2020 Furuhashi et al.
$\qquad$ (Continued)

FOREIGN PATENT DOCUMENTS

| | | |
|---|---|---|
| JP | 2020-121868 A | 8/2020 |
| JP | 2022-138826 A | 9/2022 |

OTHER PUBLICATIONS

U.S. Appl. No. 18/206,624, filed Jun. 7, 2023.
U.S. Appl. No. 18/210,095, filed Jun. 15, 2023.
U.S. Appl. No. 18/211,612, filed Jun. 20, 2023.

*Primary Examiner* — Cynthia L Schaller

(74) *Attorney, Agent, or Firm* — Harness, Dickey & Pierce, P.L.C.

(57) ABSTRACT

A laminating system sandwiches a sheet medium in a two-ply sheet in which two sheets are overlapped and partially joined together and applies heat and pressure to bond the two-ply sheet. The laminating system includes a sheet separating device, a laminate-fixing device, and a conveyor. The sheet separating device separates the two sheets of the two-ply sheet and sandwiches the sheet medium between the two sheets. The laminate-fixing device heats and presses the two-ply sheet sandwiching the sheet medium. The conveyor conveys the two-ply sheet sandwiching the sheet medium from the sheet separating device to the laminate-fixing device. The laminate-fixing device is disposed above the sheet separating device.

20 Claims, 25 Drawing Sheets

(58) Field of Classification Search
CPC ..... B32B 37/12; B32B 37/30; B32B 2250/03;
B32B 2250/40; B32B 2255/12; B32B
2260/028; B32B 2260/046; B32B
37/0053
See application file for complete search history.

(56) References Cited

U.S. PATENT DOCUMENTS

| | | | |
|---|---|---|---|
| 2021/0347589 A1* | 11/2021 | Suzuki | .................. B65H 5/305 |
| 2022/0289512 A1 | 9/2022 | Takahashi et al. | |
| 2022/0334523 A1 | 10/2022 | Akiyama et al. | |
| 2023/0202159 A1 | 6/2023 | Monma et al. | |
| 2023/0202780 A1 | 6/2023 | Takahashi et al. | |
| 2023/0202790 A1 | 6/2023 | Asano et al. | |
| 2023/0221672 A1 | 7/2023 | Sugiyama et al. | |

* cited by examiner

LAMINATING SYSTEM

CROSS-REFERENCE TO RELATED APPLICATION

This patent application is based on and claims priority pursuant to 35 U.S.C. § 119(a) to Japanese Patent Application No. 2022-197001, filed on Dec. 9, 2022, in the Japan Patent Office, the entire disclosure of which is hereby incorporated by reference herein.

TECHNICAL FIELD

Embodiments of the present disclosure relate to a laminating system.

RELATED ART

A technique called lamination processing, in which an inner sheet (paper, photo, etc.) is inserted into a two-ply sheet (laminate sheet or lamination film) in which two sheets are overlapped and joined (coupled) on one side and heat and pressure are applied to bond the two-ply sheet, is known.

For example, a sheet separating device is known in which a two-ply sheet is wrapped around a rotating member and a wrapping circumference difference is generated between an inner peripheral sheet and an outer peripheral sheet based on a geometric relation, thereby separating the two sheets of the two-ply sheet. This sheet separating device can reliably separate the two sheets of the two-ply sheet from each other without making the device complicated and large.

Further, a laminating apparatus is known that includes the sheet separating device and a heat pressing member (fixing device) that can heat and press a two-ply sheet.

SUMMARY

According to an embodiment of the present disclosure, a laminating system sandwiches a sheet medium in a two-ply sheet in which two sheets are overlapped and partially joined together and applies heat and pressure to bond the two-ply sheet. The laminating system includes a sheet separating device, a laminate-fixing device, and a conveyor. The sheet separating device separates the two sheets of the two-ply sheet and sandwiches the sheet medium between the two sheets. The laminate-fixing device heats and presses the two-ply sheet sandwiching the sheet medium. The conveyor conveys the two-ply sheet sandwiching the sheet medium from the sheet separating device to the laminate-fixing device. The laminate-fixing device is disposed above the sheet separating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 3 is a front view of a laminating system in which a laminate-fixing device is disposed in a horizontal direction on a downstream side in a conveyance direction of a sheet separating device;

FIG. 4 is a front view (part 1) of a laminating system according to a modification of one embodiment of the present disclosure;

FIG. 10 is a partial view of the laminating system illustrated in FIG. 6 following the state illustrated in FIG. 9;

FIG. 11 is a partial view of the laminating system illustrated in FIG. 6 following the state illustrated in FIG. 10;

FIG. 12 is a partial view of the laminating system illustrated in FIG. 6 following the state illustrated in FIG. 11;

FIG. 18 is a front view of a laminating system including a detachable laminate-fixing device according to one embodiment of the present disclosure;

FIGS. 26A and 26B are schematic diagrams illustrating an output result in the laminating system according to one embodiment of the present disclosure, and FIG. 26A is a schematic diagram of the laminating system according to one embodiment of the present disclosure, illustrating a state in which the inner sheet before being fed is stacked; FIG. 26B is a schematic diagram of the laminating system illustrated in FIG. 26A, illustrating a state in which the ejected inner sheet is stacked.

Figure 1:
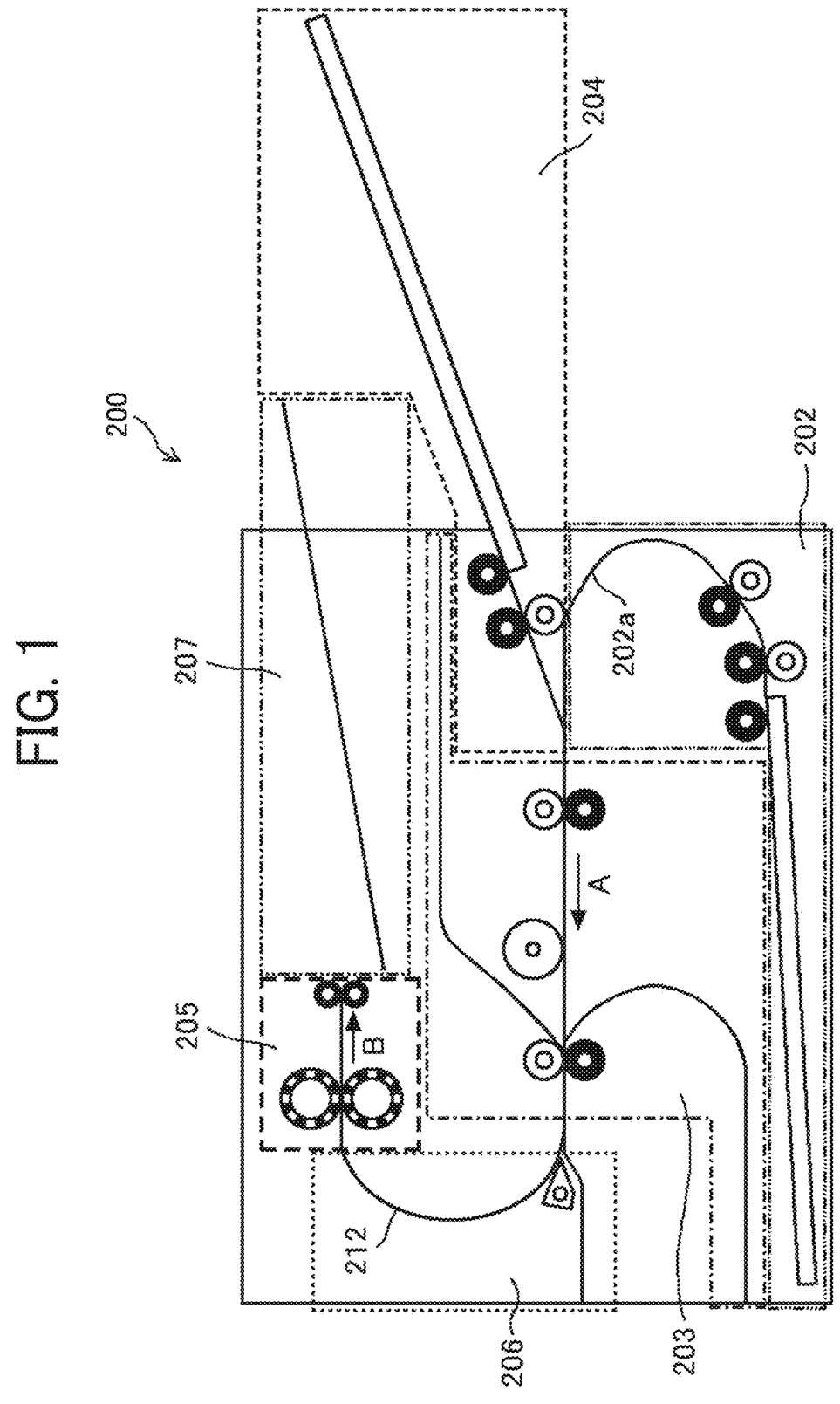
FIG. 1 is a front view of a laminating system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
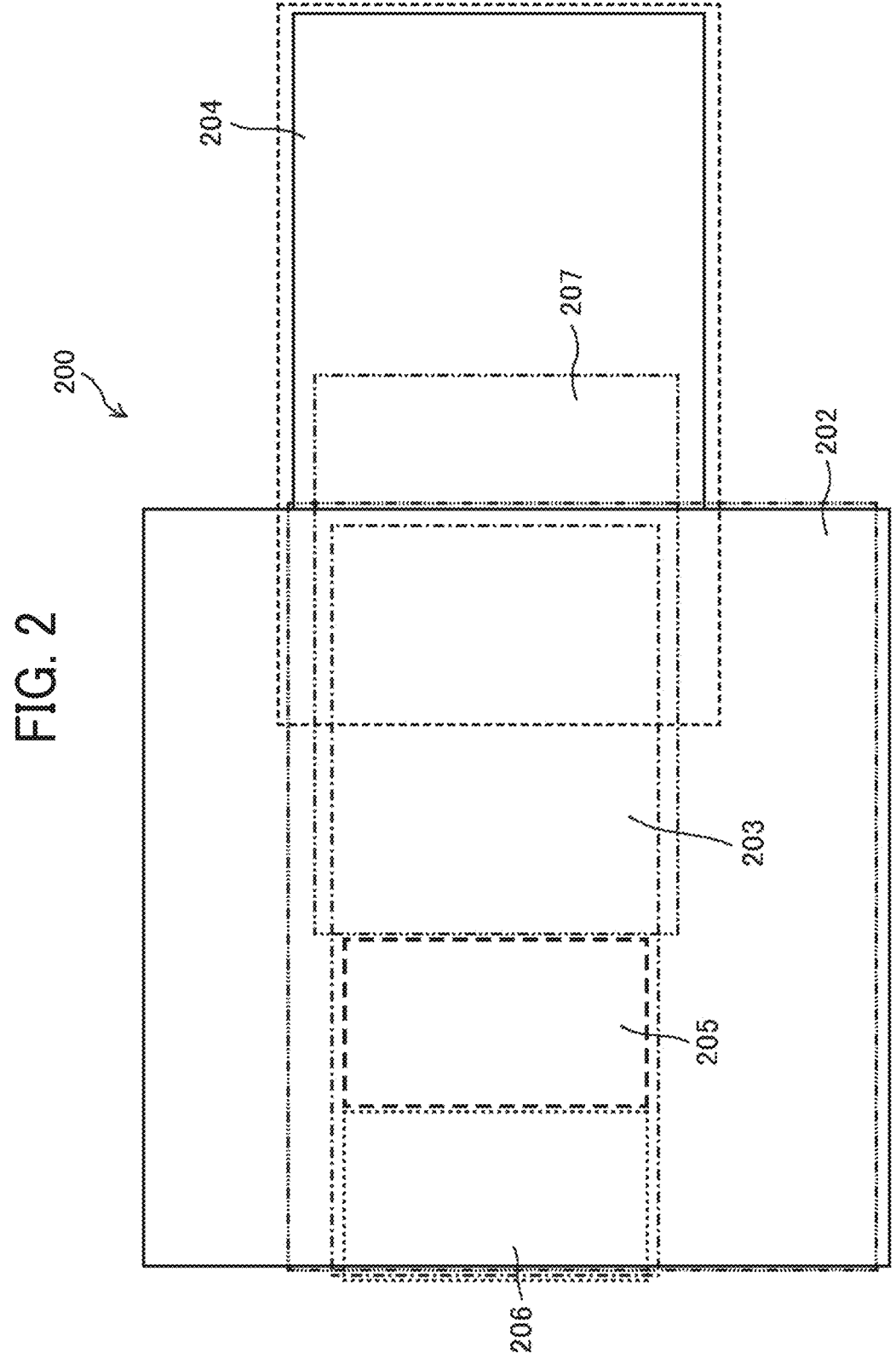
FIG. 2 is a top plan view of the laminating system of FIG. 1.

FIG. 1 is a front view illustrating a configuration of a laminating system according to one embodiment of the present disclosure, and FIG. 2 is a top plan view of the laminating system of FIG. 1. A laminating system 200 of the present embodiment has a configuration in which a series of operations including feeding and separating of a two-ply sheet (hereinafter referred to as sheet S), insertion of an inner sheet P, and lamination processing by heat pressing can be performed by one apparatus. This series of operations is carried out automatically without any aid of a user, and thus, convenience can be improved over a known technique.

Here, the sheet S is a two-ply sheet in which two sheets are overlapped and bonded together at a portion (or a side) of the two-ply sheet. For example, a first side of the two-ply sheet serves as a transparent sheet such as a transparent polyester sheet, a second side of the two-ply sheet serves as a transparent or opaque sheet and is disposed facing the first side, and the first and second sides are bonded at one side of the two-ply sheet. The two-ply sheet also includes a lamination film.

The inner sheet P is an example of sheet media inserted into the two-ply sheet. In addition to plain paper, sheet media include cardboard, postcard, envelope, thin paper, coated paper (coating paper, art paper, etc.), tracing paper, an overhead projector (OHP) sheet, etc.

As illustrated in FIG. 1, the laminating system 200 includes a sheet feeder 202 that feeds the sheet S, a sheet separating device 203 that separates the sheet S, and an inner sheet feeder 204 that feeds an inner sheet P to be inserted into the separated sheet S. The laminating system 200 further includes a laminate-fixing device 205 that bonds the sheet S into which the inner sheet P has been inserted (hereinafter referred to as sheet Sp) by heat pressing, a conveyor 206 that conveys the sheet Sp from the sheet separating device 203 to the laminate-fixing device 205, and an output section 207 to which the bonded sheet Sp is ejected.

In the laminating system 200 of the present embodiment, the laminate-fixing device 205 is disposed above the sheet separating device 203. The conveyor 206 disposed on the downstream side in the conveyance direction of the sheet separating device 203 includes a first branch conveyance path 212 that reverses the sheet Sp by 180° and conveys the sheet Sp to the laminate-fixing device 205. Therefore, a conveyance direction B of the laminate-fixing device 205 is opposite to a conveyance direction A of the sheet separating device 203.

At least a part of the sheet feeder 202 is disposed below the sheet separating device 203. The sheet feeder 202 includes a reverse path 202a that reverses and conveys the sheet S.

The output section 207 is arranged side by side with the laminate-fixing device 205 in the horizontal direction on the downstream side in the conveyance direction of the laminate-fixing device 205. At least a part of the output section 207 is disposed above the sheet separating device 203.

The inner sheet feeder 204 that conveys the inner sheet P to the sheet separating device 203 is disposed in the horizontal direction with respect to the sheet separating device 203 on the upstream side in the conveyance direction of the sheet separating device 203.

Figure 3:
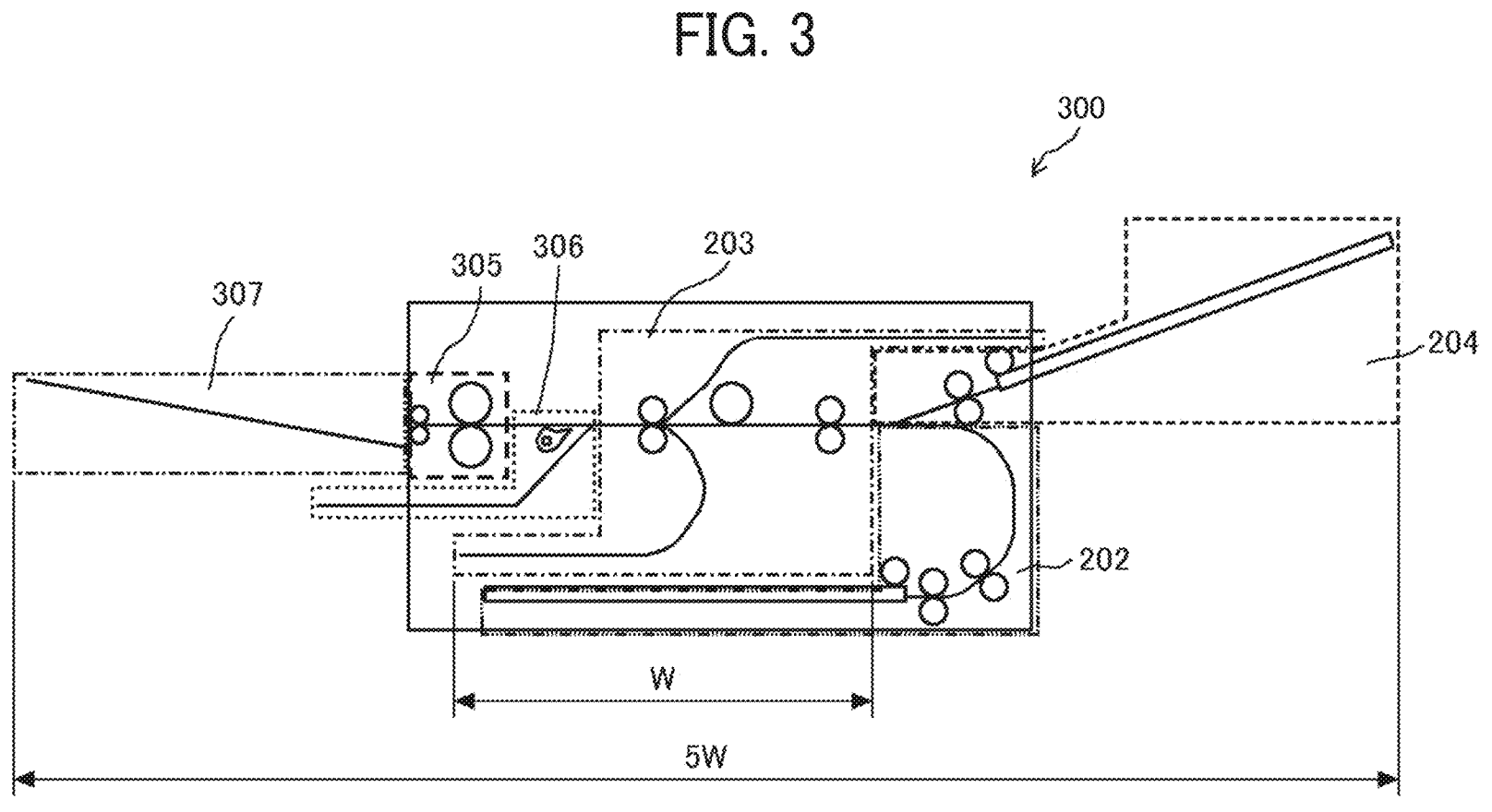

Next, advantages of the laminating system 200 of the present embodiment will be described. FIG. 3 is a front view illustrating a configuration of a laminating system in which a laminate-fixing device is disposed in a horizontal direction on a downstream side in a conveyance direction of a sheet separating device. In FIG. 3, elements identical to those illustrated in FIGS. 1 and 2 are given identical reference numerals, and the detailed descriptions thereof are omitted.

A laminating system 300 of FIG. 3 is provided with a conveyor 306, a laminate-fixing device 305, and an output section 307 in order in the horizontal direction on the downstream side in the conveyance direction of the sheet separating device 203. Thus, in the case of the horizontal conveyance configuration including the inner sheet feeder 204, a space (5W) that is about 5 times the length (W) of the horizontal conveyance path of the sheet separating device 203 is required.

For example, in a case where the laminating system 300 is a tabletop type and the horizontal conveyance path (W) of the sheet separating device 203 is 300 mm, the total length of the horizontal conveyance path of the laminating system 300 reaches 1500 mm. This is assumed to be inconvenient to use on a general work machine.

On the other hand, in the laminating system 200 of the present embodiment, the laminate-fixing device 205 is disposed above the sheet separating device 203, and the conveyance path of the laminate-fixing device 205 with respect to the sheet separating device 203 is reversed and disposed parallel to the height direction. Therefore, the lateral width (footprint) of the entire device can be reduced.

Figure 4:
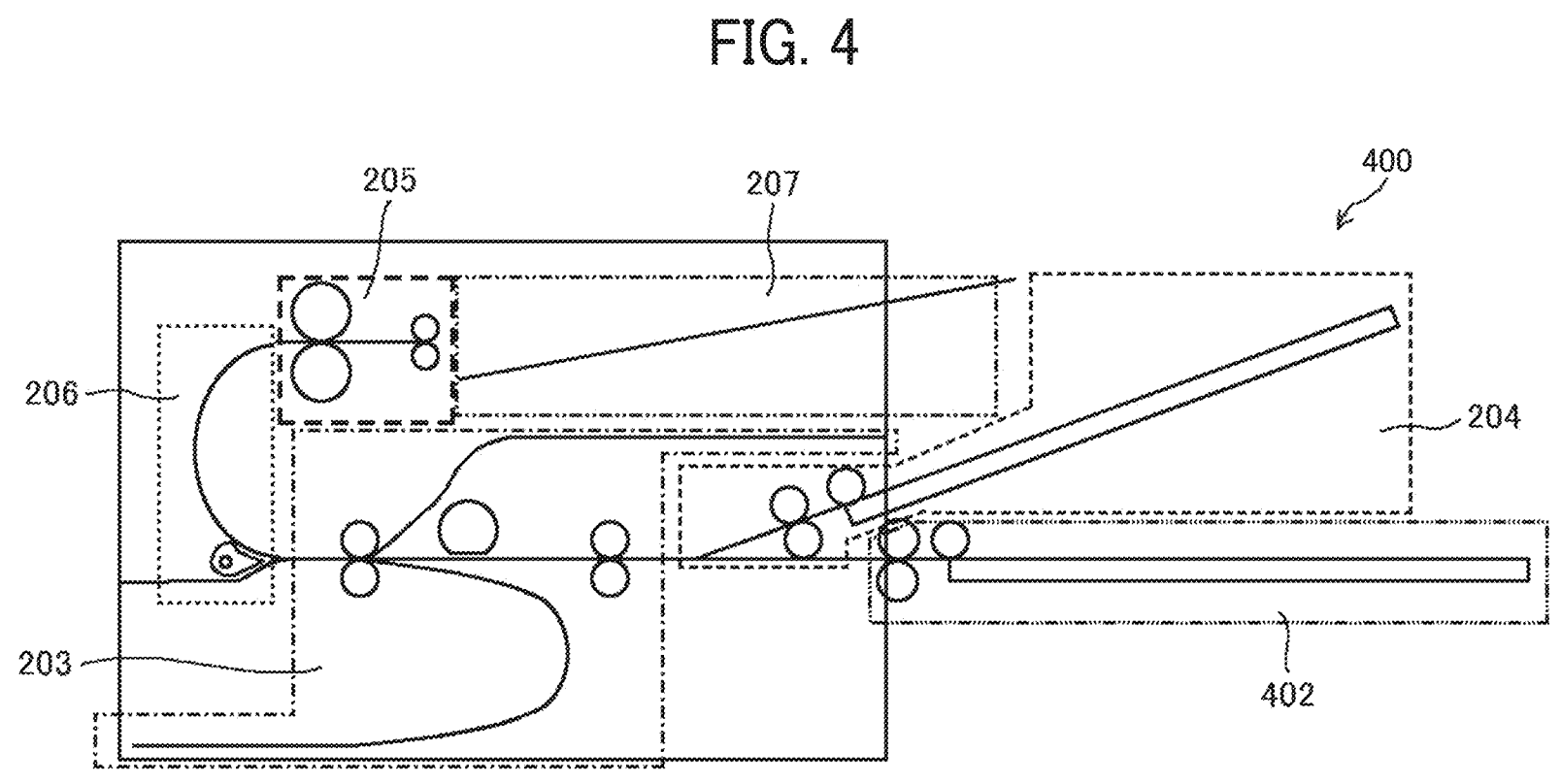
Figure 5:
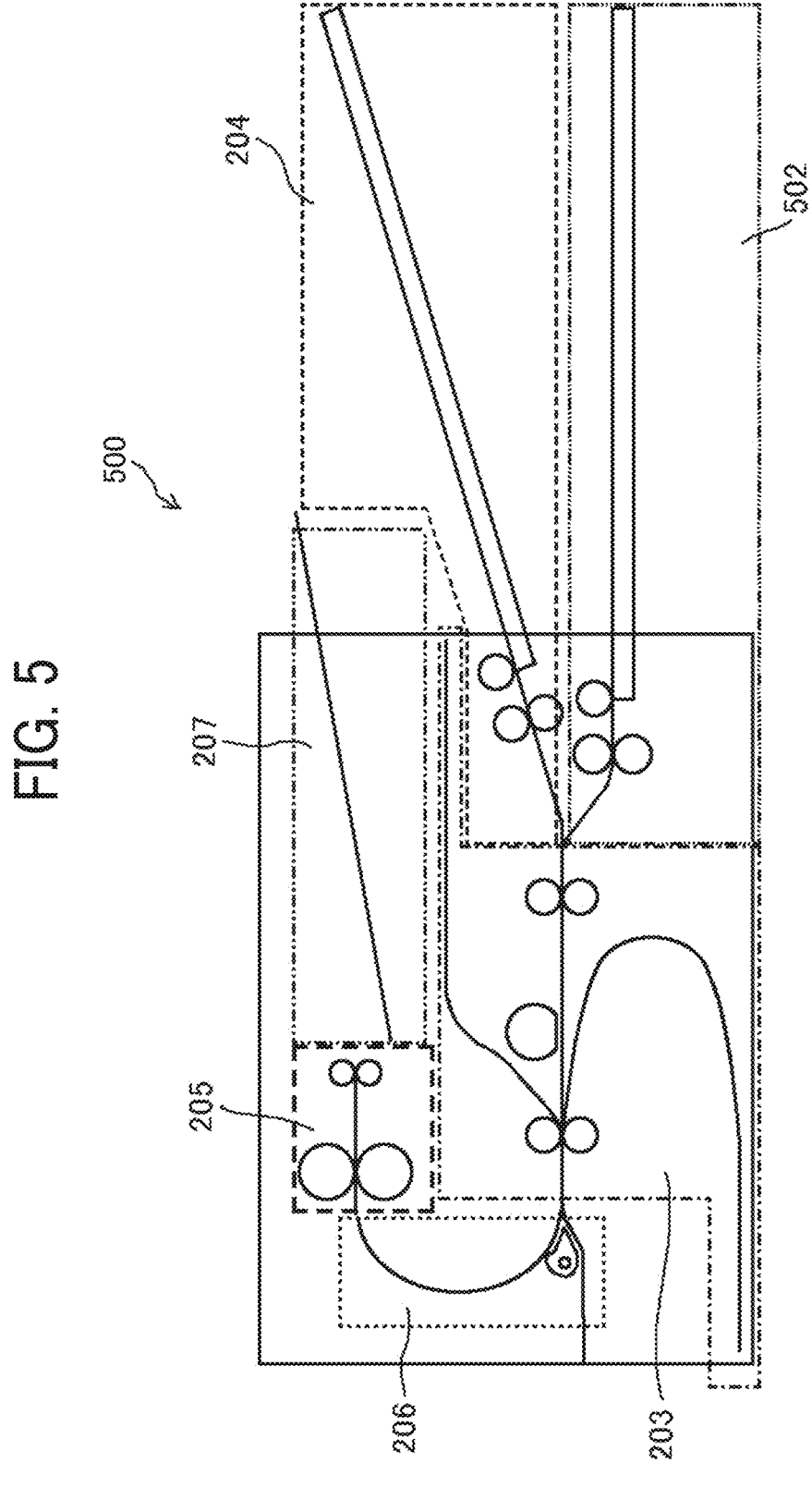
FIG. 5 is a front view of a laminating system according to another modification of one embodiment of the present disclosure.

FIGS. 4 and 5 are each a front view of a laminating system according to a modification of the embodiment of the present disclosure. In FIGS. 4 and 5, elements identical to those illustrated in FIGS. 1 and 2 are given identical reference numerals, and the detailed descriptions thereof are omitted.

A laminating system 400 of FIG. 4 includes a sheet feeder 402 coupled in the horizontal direction on the upstream side in the conveyance direction of the sheet separating device 203. In this case, the overall length of the horizontal conveyance path is slightly larger than that of the laminating system 200 of FIG. 1, but there is an advantage that the length can be reduced in the height direction.

A laminating system 500 of FIG. 5 includes a sheet feeder 502 that is conveyed from a position one step lower in the height direction and coupled on the upstream side in the conveyance direction of the sheet separating device 203. In this case, there is an advantage that there is almost no difference in the total length of the horizontal conveyance path as compared with the laminating system 200 of FIG. 1 and the length in the height direction can be almost equal to that of the laminating system 400 of FIG. 4.

Here, the stacking of the sheet S on the sheet feeders 202, 402, and 502 will be supplemented. The sheet S (laminate sheet or lamination film) has a face, which serves as an upper face in a case where the sheet S is placed flat, as a front surface. In such a case, when either one of both faces is set and conveyed as the upper face, the quality of the ejected sheet is not affected.

Here, the conveyance direction is restricted. In the laminating system of the present embodiment, the sheet S is conveyed in the conveyance direction A with the joined one side as a head. Therefore, as illustrated in FIG. 1, when the sheet feeder 202 is disposed below the sheet separating device 203 and the sheet S is reversed and conveyed, the sheet S is stacked on the "right side" with the joint as the head.

On the other hand, as illustrated in FIGS. 4 and 5, in a case where the conveyance direction of the sheet feeders 402 and 502 is arranged horizontally to the conveyance direction of the sheet separating device 203, the sheet S is stacked on the "left side" with the joint as the tail.

Subsequently, a series of operations including feeding and separating of the sheet S, insertion of the inner sheet P, and lamination processing by heat pressing, which are performed by the laminating system 200 of the present embodiment, will be described.

Here, the present applicant has filed an application for a technique of separating the sheet S (a two-ply sheet (sheet S) is wrapped around a rotating member, and a wrapping circumference difference is generated between an inner peripheral sheet and an outer peripheral sheet based on a geometrical relation, and thus, the two sheets of the two-ply sheet are separated) as Japanese Unexamined Patent Application Publication No. 2020-121868. Hereinafter, configurations and operations according to the present embodiment will be described.

Figure 6:
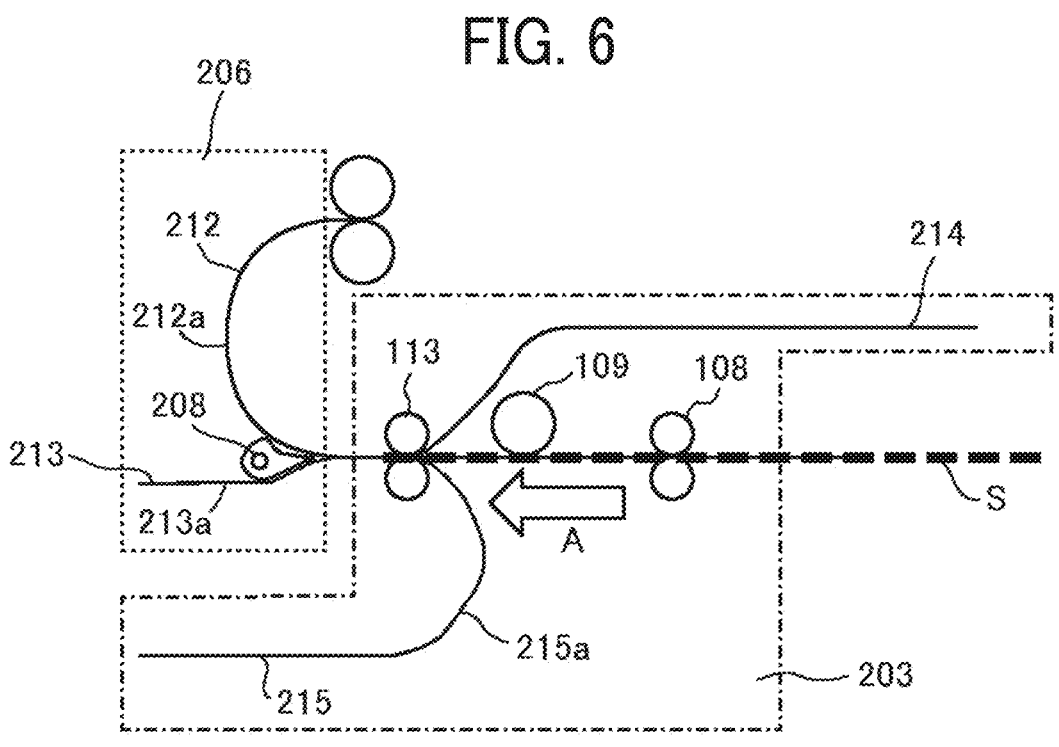
FIG. 6 is a partial view of the laminating system according to one embodiment of the present disclosure.

FIG. 6 is a configuration diagram (part 1) illustrating main parts of the laminating system illustrated in FIGS. 1 and 2. As illustrated in FIG. 6, the sheet separating device 203 includes an entrance roller pair 108, a wrapping roller 109 as a rotating member, an exit roller pair 113, and the like. Each of the entrance roller pair 108 and the exit roller pair 113 is, for example, two rollers paired with each other and is rotationally driven by a driving means (such as a motor). The entrance roller pair 108 is rotationally driven in one direction, and the exit roller pair 113 is rotationally driven in forward and reverse directions to nip and convey the sheet S and the inner sheet P.

That is, the exit roller pair 113 can convey the nipped sheet S toward the downstream side in the conveyance direction, and can also convey the sheet S toward the wrapping roller 109 in the opposite direction (pulling direction).

The wrapping roller 109 between the entrance roller pair 108 and the exit roller pair 113 is rotationally driven in forward and reverse directions by a driving means (motor or the like), and the rotation thereof can be switched in both directions (clockwise/counterclockwise).

Further, the sheet separating device 203 includes a first separator 214 and a second separator 215 which guide the two separated sheets respectively and separate the two separated sheets vertically from each other. The second separator 215 below the first separator 214 has a reverse path 215a, and the first separator 214 and the second separator 215 guide one sheet in different guiding directions. The second separator 215 guides the leading end of the sheet to the outside of the device.

The conveyor 206 includes a first branch conveyance path 212, a second branch conveyance path 213, and a bifurcating claw 208 that switches to one of the first branch conveyance path 212 and the second branch conveyance path 213. The first branch conveyance path 212 is coupled to the laminate-fixing device 205 via the reverse path 212a. On the other hand, the second branch conveyance path 213 has a switch-back path 213a and guides the leading end of the conveyed sheet S to the outside of the device.

Subsequently, sheet conveyance of the laminating system 200 will be described with reference to FIGS. 6 to 12. In FIGS. 7 to 12, elements identical to those illustrated in FIG. 6 are given identical reference numerals, and the detailed descriptions thereof are omitted.

Separating of Sheet

In FIG. 6, the sheet S from the sheet feeder 202 (see FIG. 1) is conveyed in the conveyance direction A, and a part (joint) of the joined two sheets reaches a nip member of the exit roller pair 113.

Figure 7:
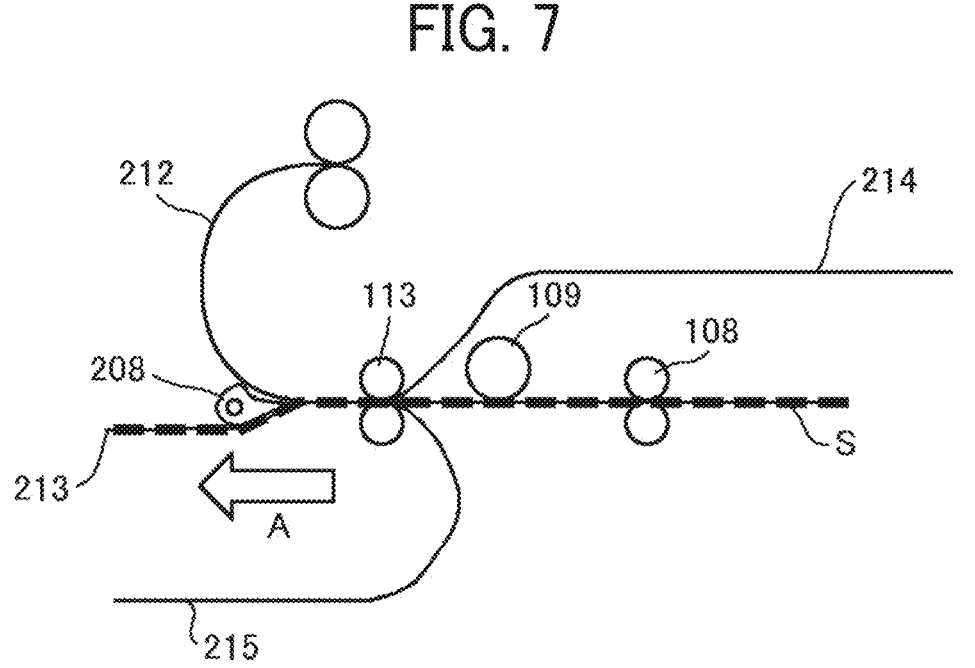
FIG. 7 is a partial view of the laminating system following the state illustrated in FIG. 6.

Next, in FIG. 7, the laminating system 200 switches the bifurcating claw 208 of the conveyor 206 and conveys the sheet S toward the second branch conveyance path 213.

Figure 8:
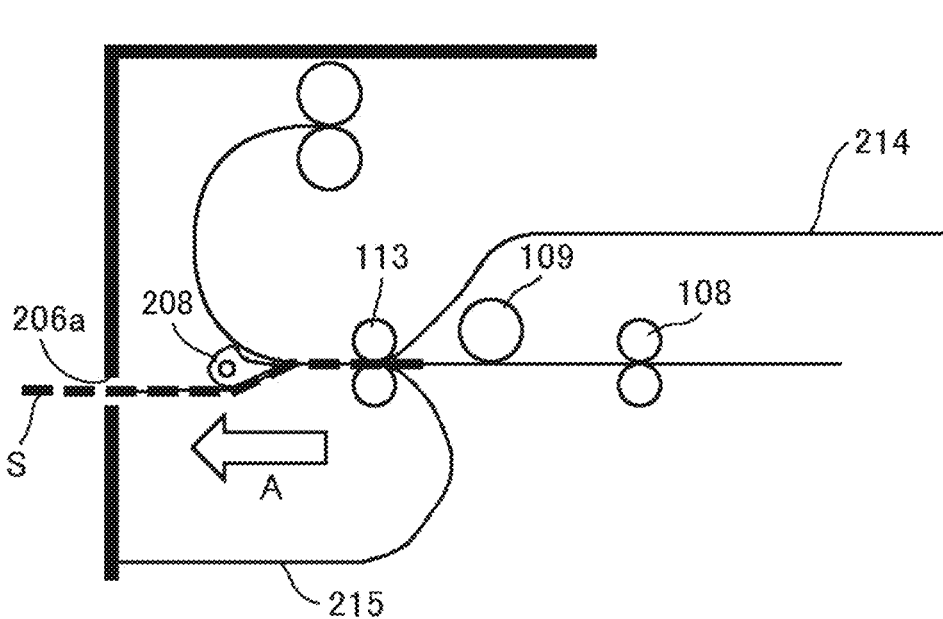
FIG. 8 is a partial view of the laminating system illustrated in FIG. 6 following the state illustrated in FIG. 7.

Here, as illustrated in FIG. 8, the laminating system 200 guides the leading end (joint) of the sheet S to the outside of the device from an opening 206a disposed in the exterior of the conveyor 206, and nips the tail end of the sheet S by the exit roller pair 113. At this time, the leading end of the sheet S has not yet been subjected to the lamination processing (heat fixing processing), and thus, the leading end is not stiff and hangs down in the vertical direction by gravity.

Subsequently, the laminating system 200 reversely rotates (counterclockwise) the exit roller pair 113 to convey the sheet S toward the wrapping roller 109 in a direction opposite to the conveyance direction A. Thus, the sheet S is wrapped around the wrapping roller 109, and the two sheets of the sheet S are separated. For a detailed description of this wrapping step, refer to Japanese Unexamined Patent Application Publication No. 2020-121868 (paragraphs [0039] to [0053]).

Thus, the second branch conveyance path 213 of the conveyor 206 is a so-called switchback path that temporarily accommodates the conveyed sheet S and conveys an end (open end) of the sheet S which is not joined to the sheet separating device. In addition, since the leading end of the conveyed sheet S is to be guided to the outside of the device, it is not necessary to separately provide a conveyance path in the conveyor 206, and the lateral width (footprint) of the device can be further reduced.

Opening of Sheet

Figure 9:
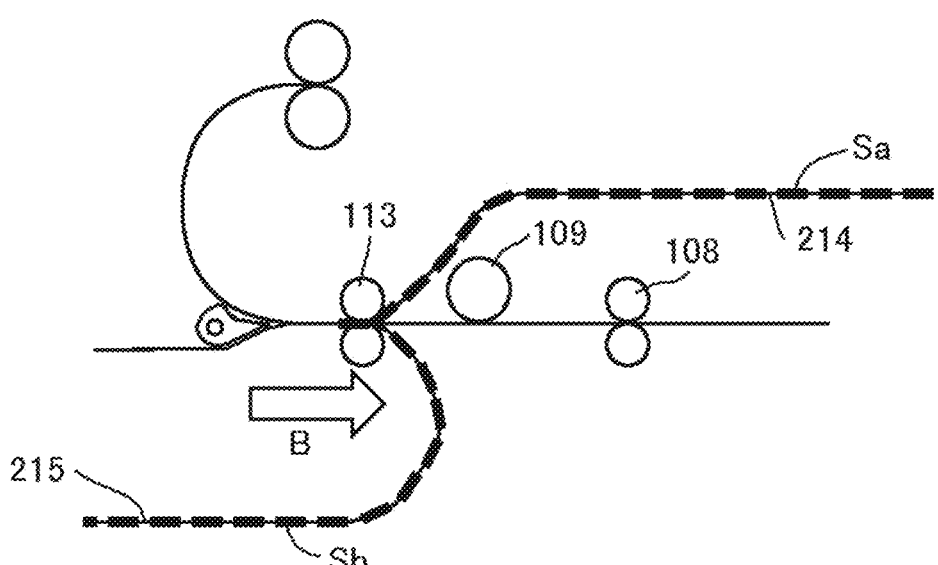
FIG. 9 is a partial view of the laminating system illustrated in FIG. 6 following the state illustrated in FIG. 8.

As illustrated in FIG. 9, in the sheet S separated into two sheets, one sheet Sa is conveyed to the first separator 214 and the other sheet Sb is conveyed to the second separator 215 in the direction B opposite to the conveyance direction A by the exit roller pair 113. Therefore, the sheet S is largely opened into the two sheets.

At this time, the conveyance speeds of the sheets Sa and Sb conveyed to the first separator 214 and the second separator 215 are the same, and therefore the conveyance amounts thereof are also the same. In addition, since the second separator 215 guides the leading end of the sheet Sb to the outside of the device, it is not necessary to separately provide a conveyance path in the conveyor 206 (lateral width reduction of the device).

Insertion of Inner Sheet

Figures 10, 11:
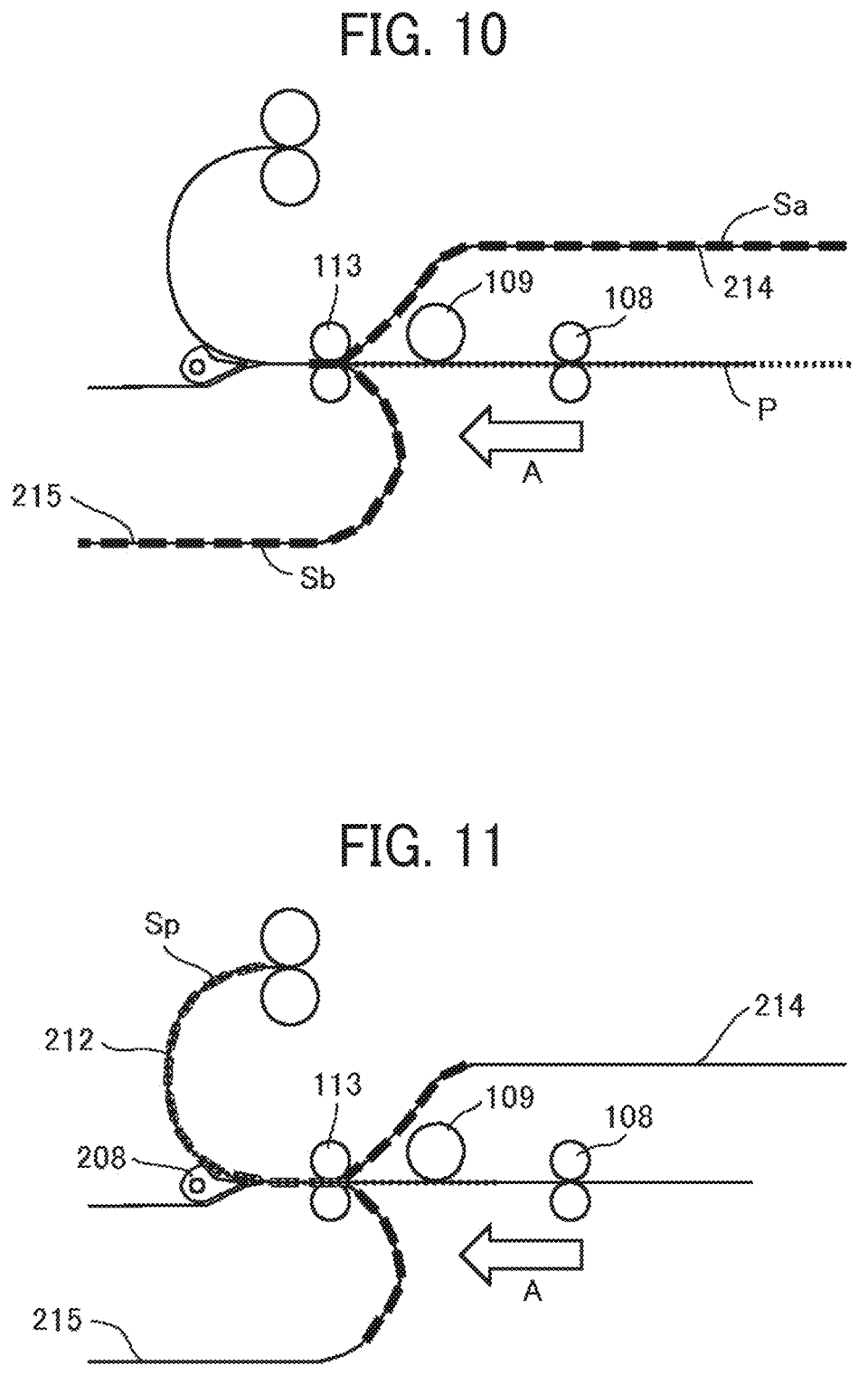

Next, as illustrated in FIG. 10, the laminating system 200 rotates the entrance roller pair 108 to convey the inner sheet P conveyed from the inner sheet feeder 204 (see FIG. 1)

toward the exit roller pair 113 in the conveyance direction A. Thus, the inner sheet P is inserted into the sheet S in a manner of abutting against the joint.

Subsequently, as illustrated in FIG. 11, the laminating system 200 rotates the exit roller pair 113 clockwise to merge the sheet S and the inner sheet P, and inserts the inner sheet P into the opened sheet S. At this time, the laminating system 200 switches the bifurcating claw 208 of the conveyor 206 and conveys the sheet S (sheet Sp), into which the inner sheet P is inserted, toward the first branch conveyance path 212.

Bonding and Ejection of Sheet

Figure 12:
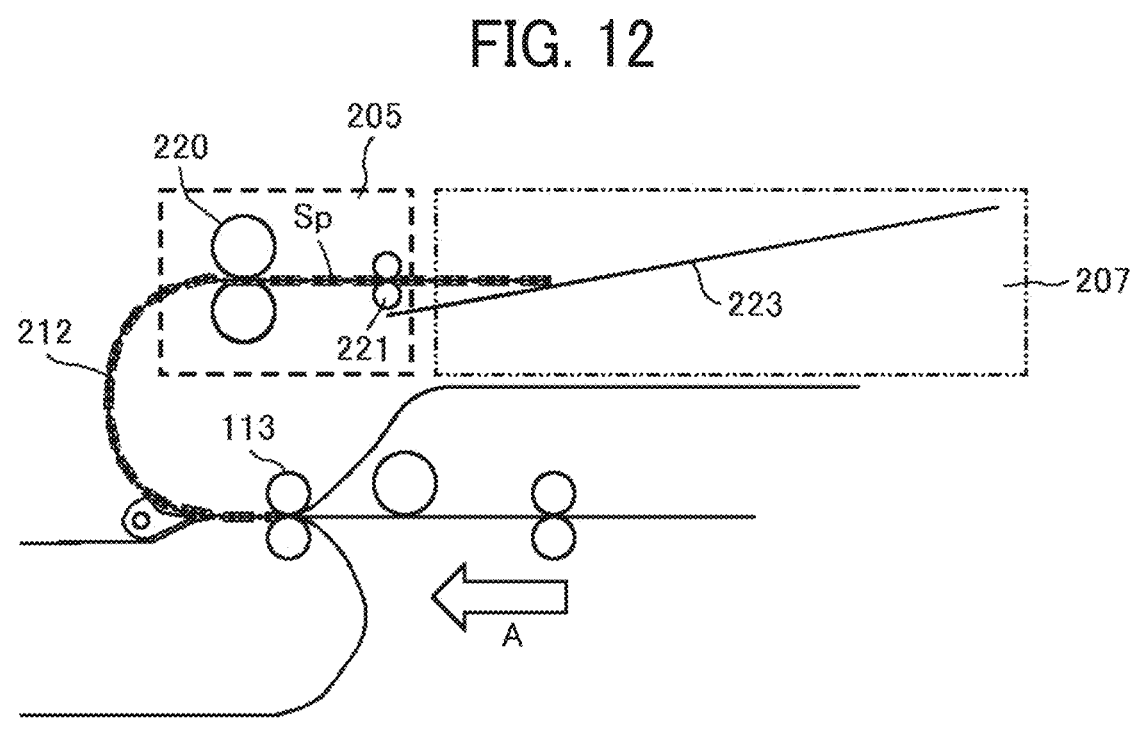

As illustrated in FIG. 12, the sheet Sp passes through the first branch conveyance path 212 which is a reverse path and is conveyed to the laminate-fixing device 205.

The sheet Sp is heated and pressed by a heat pressing roller pair 220 included in the laminate-fixing device 205. When the two-ply sheet is a lamination film, an adhesive (made of EVA) applied to the inside of the film reaches a melting point and melts. Subsequently, the sheet Sp is conveyed to the output section 207 via an ejection roller pair 221.

The sheet Sp heated to a high temperature is pulled by the ejection roller pair 221 having a linear velocity faster than that of the heat pressing roller pair 220, so that curl generated in the sheet Sp can be suppressed.

During the conveyance to the output section 207, the heat accumulated in the sheet Sp is released to the atmosphere, and the temperature of the sheet Sp decreases. When the temperature of the sheet Sp is lowered, the adhesives of the two films are bonded to each other and integrated with the inserted inner sheet.

The output section 207 includes, for example, a sheet ejection tray 223 which is inclined and exposed to the outside of the machine, and the sheet Sp is ejected onto the sheet ejection tray 223. Therefore, the user can take out the sheet Sp as it is from the sheet ejection tray 223.

FIGS. 13 to 16 are front views (No. 1 to 4) illustrating various embodiments of the sheet separating device. The following four patterns are considered as guide paths of the first separator 214 and the second separator 215 disposed in the sheet separating device 203.

Pattern No. 1

Figure 13:
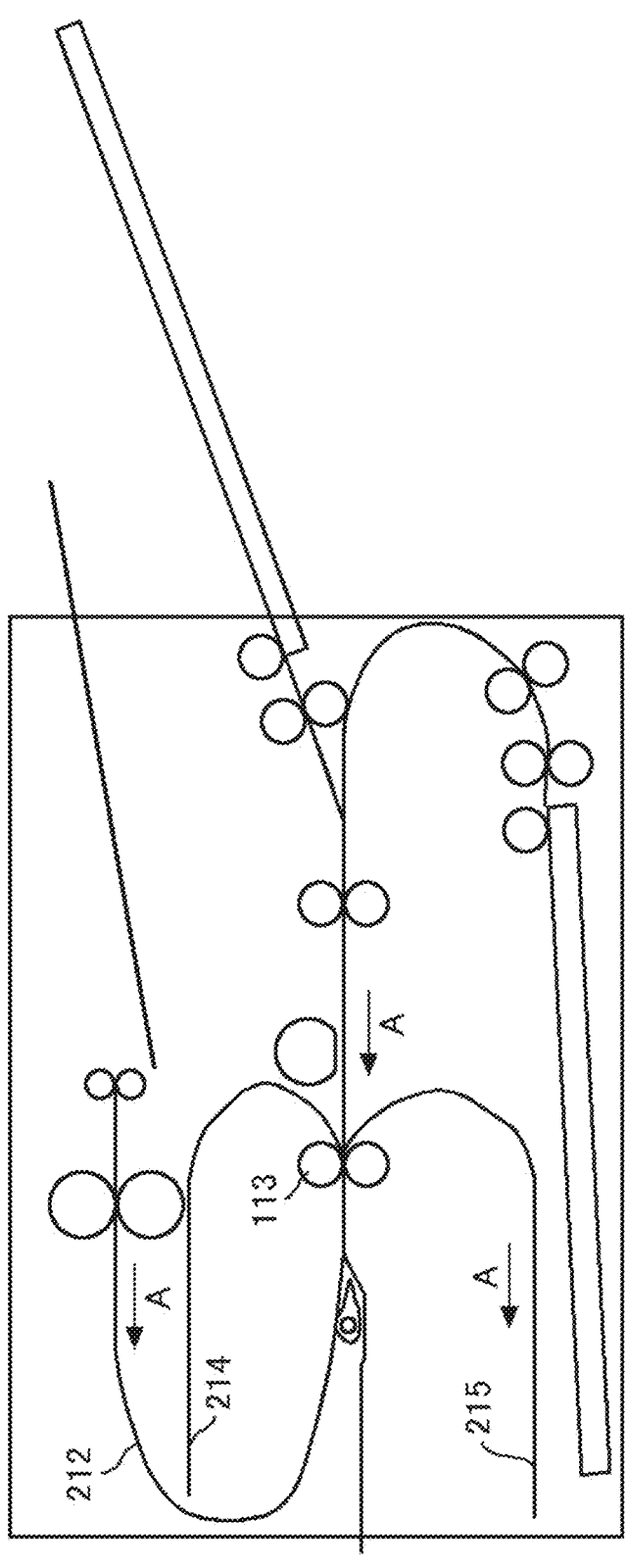
FIG. 13 is a front view of the sheet separating device according to one embodiment of the present disclosure.

In FIG. 13, the first separator 214 and the second separator 215 each have a guide path that reverses the separated sheet S from the nip member of the exit roller pair 113 and guides the sheet S in the same direction as the conveyance direction A. That is, the first separator 214 and the second separator 215 are to guide the respective sheets (Sa, Sb) in the same direction (conveyance direction A).

In this case, the first branch conveyance path 212 of the conveyor 206 is disposed in a detour so as not to interfere with the leading end of the first separator 214. Therefore, when corresponding to a larger sheet size (for example, A4 size (sheet length: 303 mm)), the entire device is expanded in the left direction in the drawing.

Pattern No. 2

Figure 14:
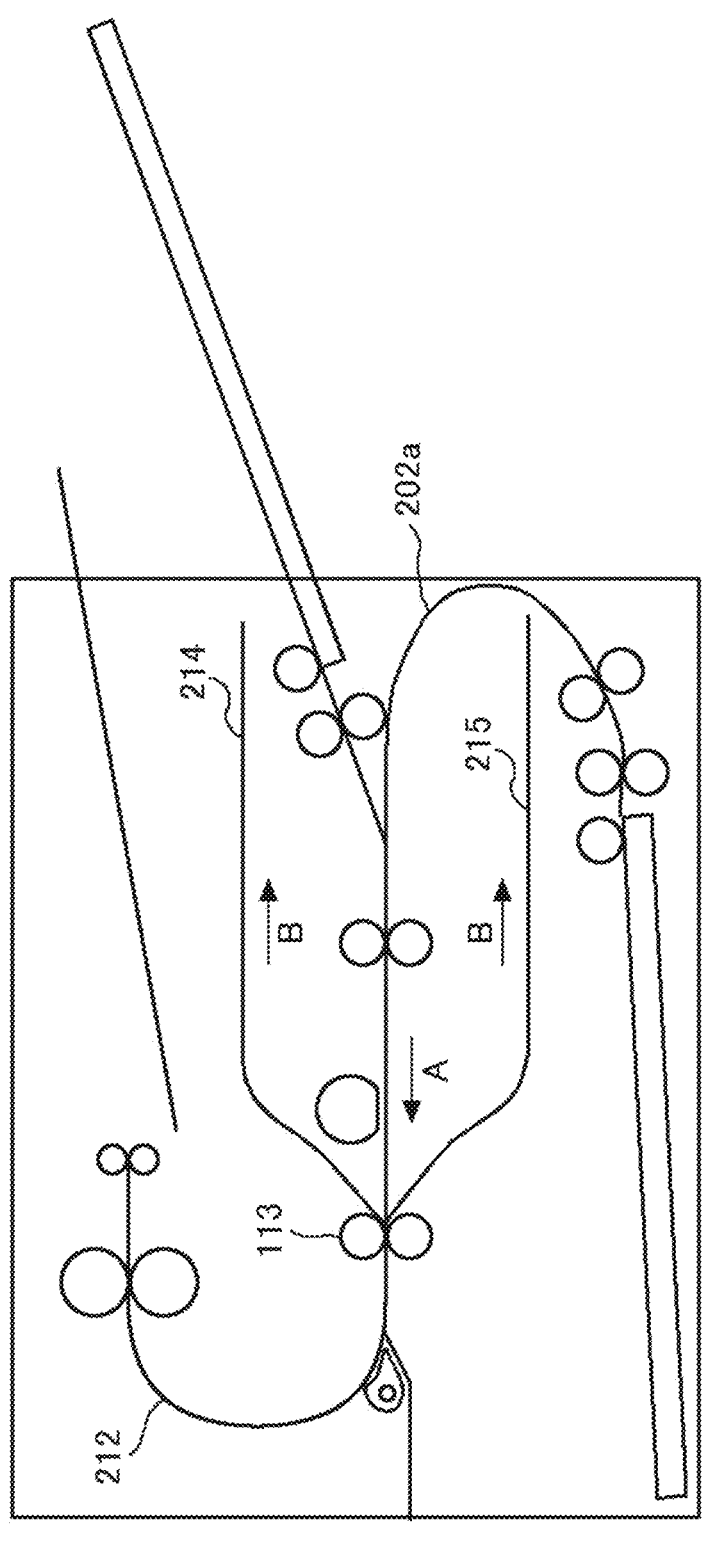
FIG. 14 is a front view of the sheet separating device according to one embodiment of the present disclosure.

In FIG. 14, the first separator 214 and the second separator 215 each have a guide path that guides the separated sheet S from the nip member of the exit roller pair 113 in the direction B opposite to the conveyance direction A. That is, the first separator 214 and the second separator 215 are to guide the respective sheets (Sa, Sb) in the same direction (conveyance direction B).

In this case, when the sheet feeder 202 is disposed below the sheet separating device, the reverse path 202*a* of the sheet feeder 202 is detoured so as not to interfere with the leading end of the second separator 215. Therefore, when corresponding to a larger sheet size, the entire device is expanded in the right direction in the drawing.

Pattern No. 3

Figure 15:
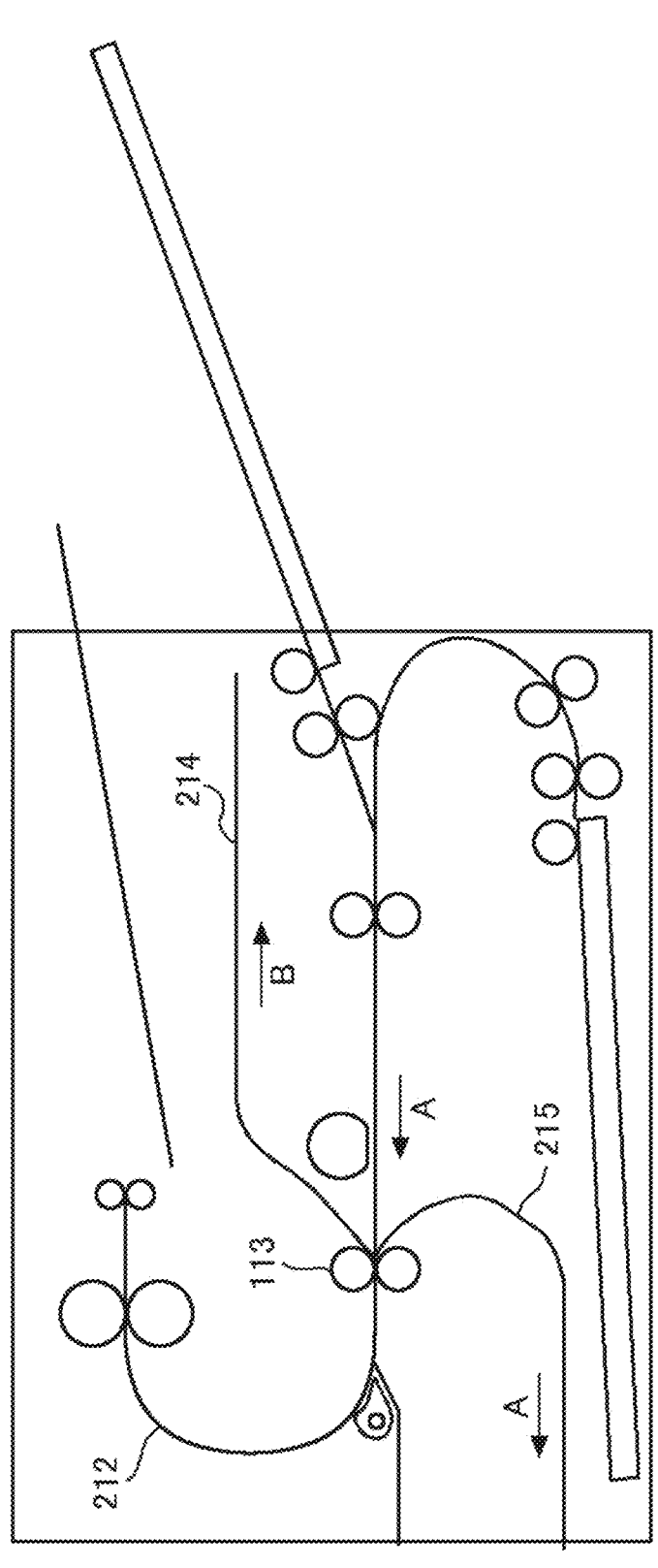
FIG. 15 is a front view of the sheet separating device according to one embodiment of the present disclosure.

In FIG. 15, the first separator 214 has a guide path that guides one of the separated sheets S from the nip member of the exit roller pair 113 in the direction B opposite to the conveyance direction A. On the other hand, the second separator 215 has a guide path that reverses the other sheet from the nip member of the exit roller pair 113 and guides the other sheet in the same direction as the conveyance direction A. That is, the first separator 214 and the second separator 215 are to guide the respective sheets in opposite directions.

This configuration is the same as that of the embodiment illustrated in FIG. 1, and the first separator 214 can secure a guide path for temporarily accommodating one of the separated sheets S without interfering with other conveyance paths. On the other hand, since the second separator 215 guides the leading end of the other sheet to the outside of the device, a guide path for temporarily accommodating the other sheet can be secured. Therefore, it is possible to cope with a sheet size that is large to some extent without expanding the device size.

Pattern No. 4

Figure 16:
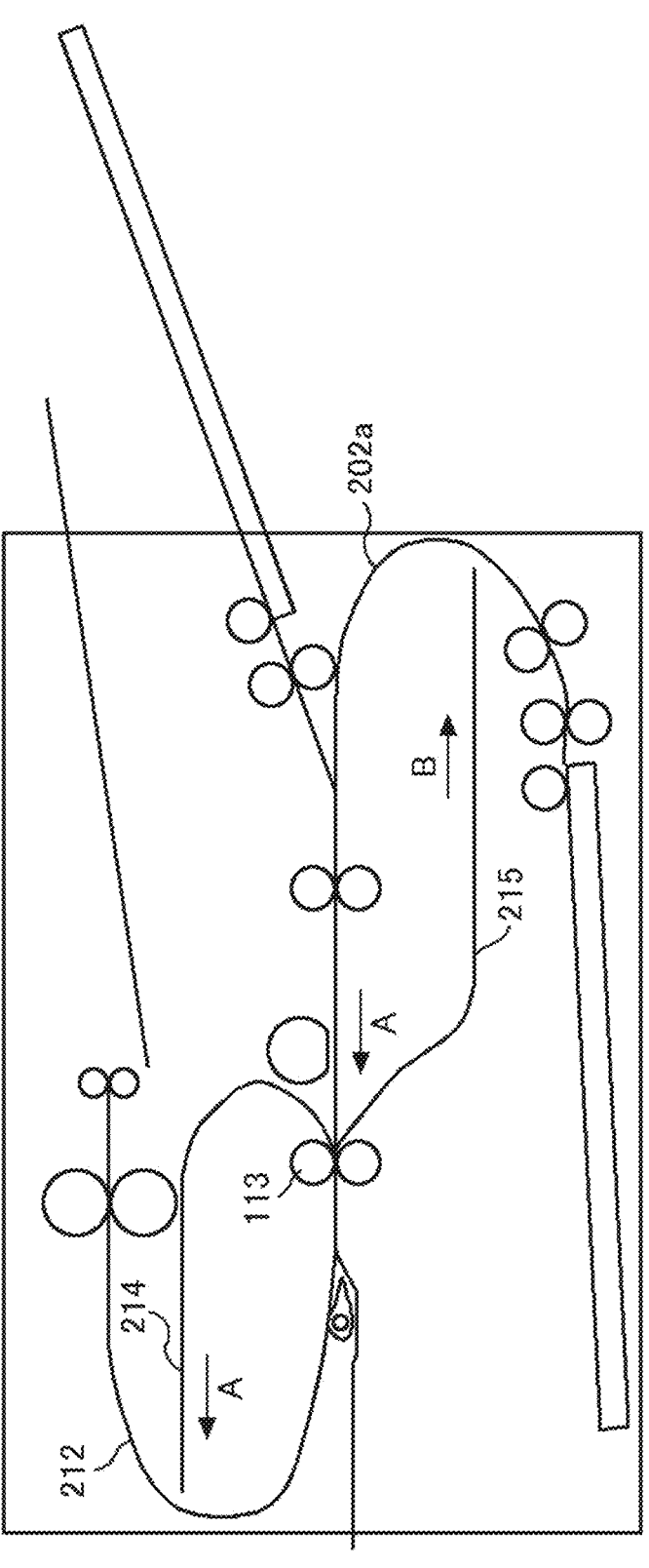
FIG. 16 is a front view of the sheet separating device according to one embodiment of the present disclosure.

In FIG. 16, the first separator 214 has a guide path that reverses one of the separated sheets S from the nip member of the exit roller pair 113 and guides the separated sheet S in the same direction as the conveyance direction A. On the other hand, the second separator 215 has a guide path that guides the other sheet from the nip member of the exit roller pair 113 in the direction B opposite to the conveyance direction A. That is, the first separator 214 and the second separator 215 are to guide the respective sheets in opposite directions.

In this case, both the first separator 214 and the second separator 215 are expanded on both sides in the width direction of the device so that the leading ends do not interfere with other conveyance paths. Here, both the first separator 214 and the second separator 215 are completely accommodated in the device, and the sheet to be guided by each of the first separator 214 and the second separator 215 is also in the device. Therefore, the sheet is not exposed to the outside of the device until the lamination processing is completed, and the sheet can be prevented from being externally affected such as being touched by a user or the like.

Figure 17:
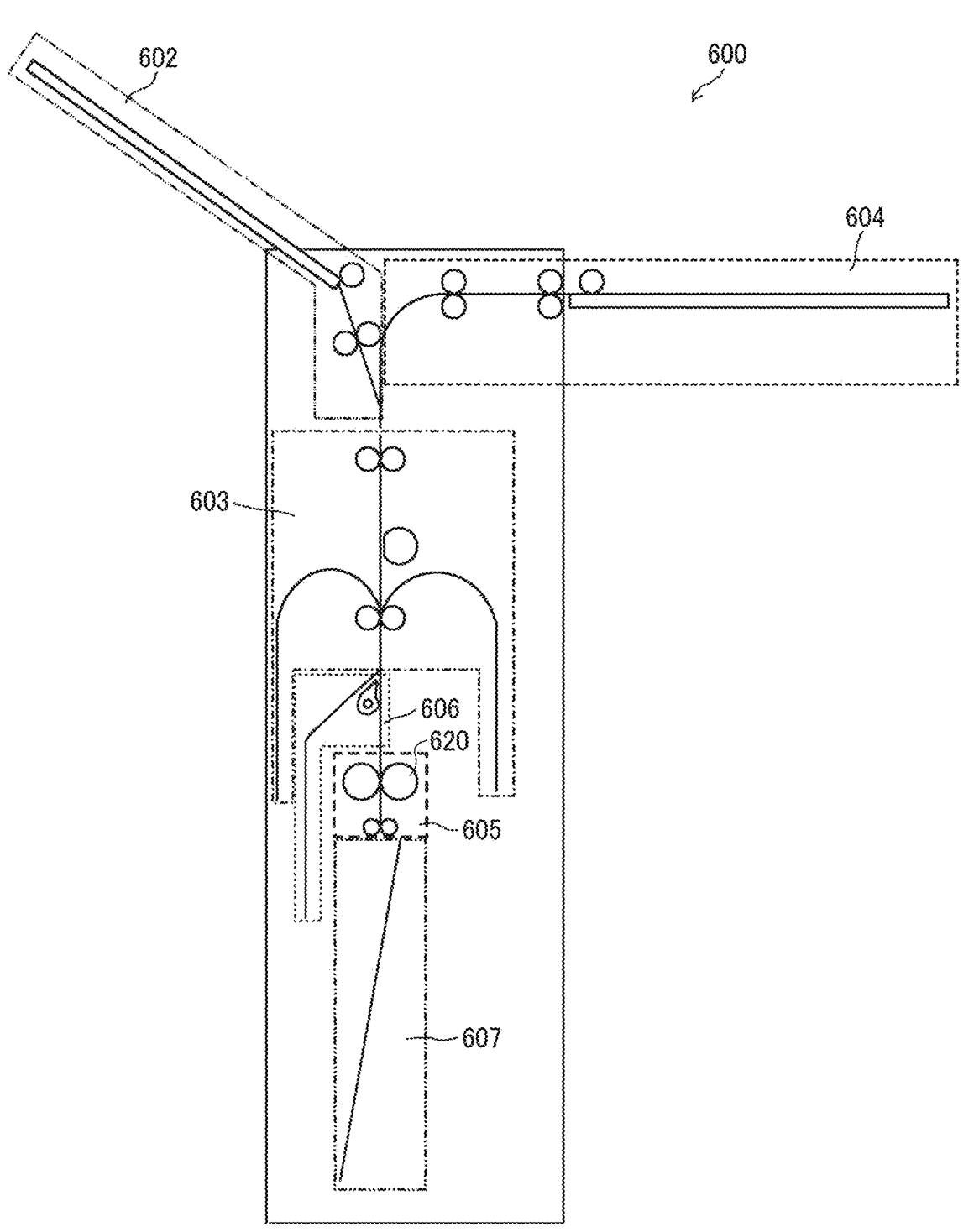
FIG. 17 is a front view of a laminating apparatus according to a comparative example having a vertical conveyance (vertically downward) path.

FIG. 17 is a front view of a laminating apparatus according to a comparative example having a vertical conveyance (vertically downward) path. As a laminating apparatus 600 according to the comparative example, a configuration having a vertical conveyance path which is vertically downward after a sheet separating device 603 is known.

In the laminating apparatus 600, the sheet S is fed from a sheet feeder 602, and the inner sheet P is fed from an inner sheet feeder 604. The sheet S is separated into two sheets by the sheet separating device 603, and the inner sheet P is inserted into the opening of the sheet S. The sheet S into which the inner sheet P has been inserted is thermally fixed by a laminate-fixing device 605 and ejected to an output section 607. A conveyor 606 is used to feed the sheet S back to the sheet separating device 603.

Thus, the laminating apparatus 600 includes the sheet separating device 603 and the conveyor 606 above the laminate-fixing device 605, and the conveyance path of the sheet separating device 603 and the conveyance path of the laminate-fixing device 605 are on the same straight line.

A heater is mounted inside each roller of a heat pressing roller pair 620 disposed in the laminate-fixing device 605. Before the laminate-fixing device 605 receives the sheet, the heater is powered on, and heating of the heater is started.

The heat pressing roller pair 620 which has been heated not only applies heat to the sheet but also dissipates heat to the upper portion of the machine during idling. Therefore, the temperatures of a conveyance guide plate of the sheet separating device 603 and the conveyor 606 and other drive components may rise.

Specifically, the sheet may stick to the surface of the guide plate of the sheet separating device 603 and increase the conveyance resistance, or a drive component such as a gear may be thermally deformed and cause an operation failure.

Figure 18:
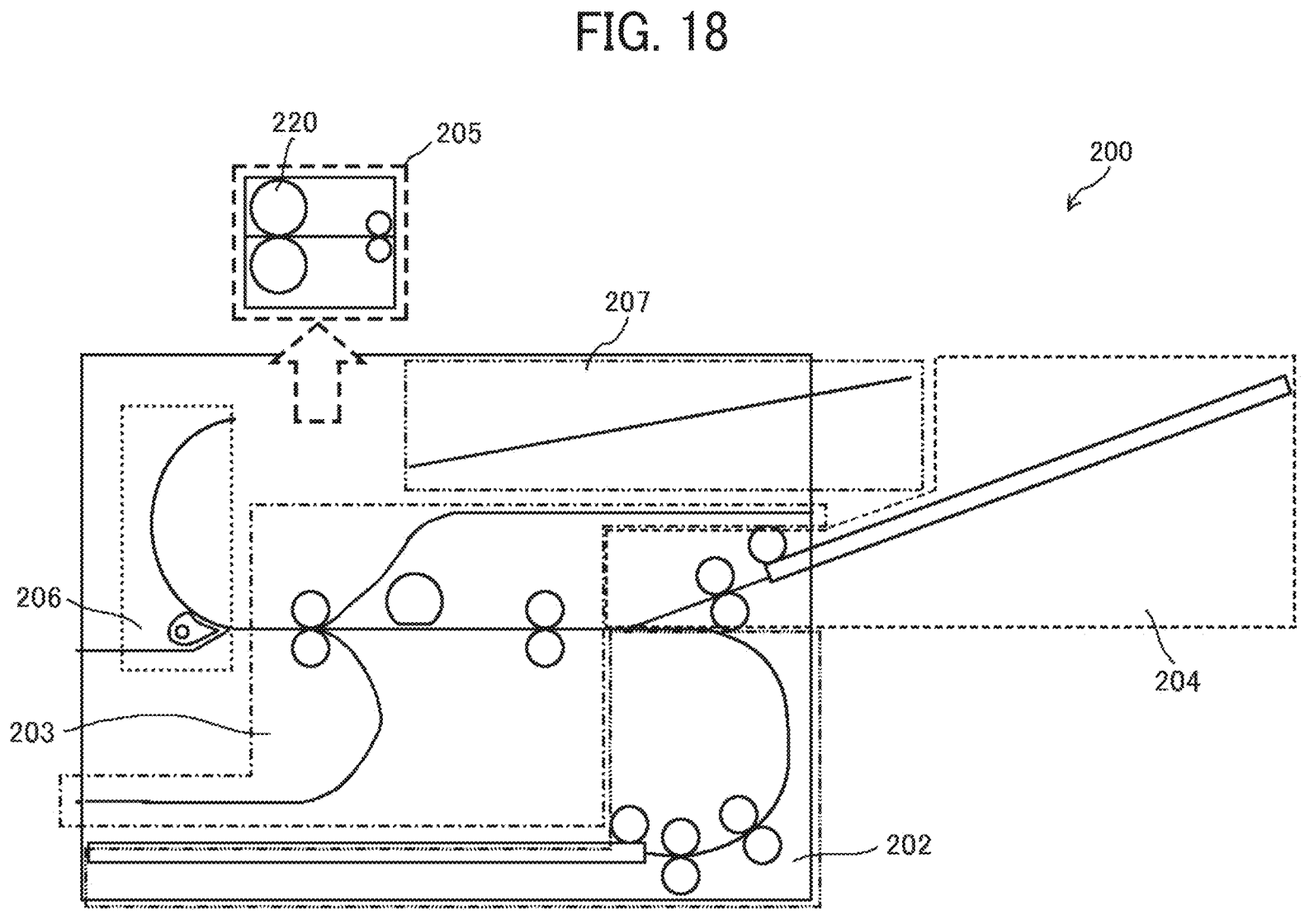
Figure 19:
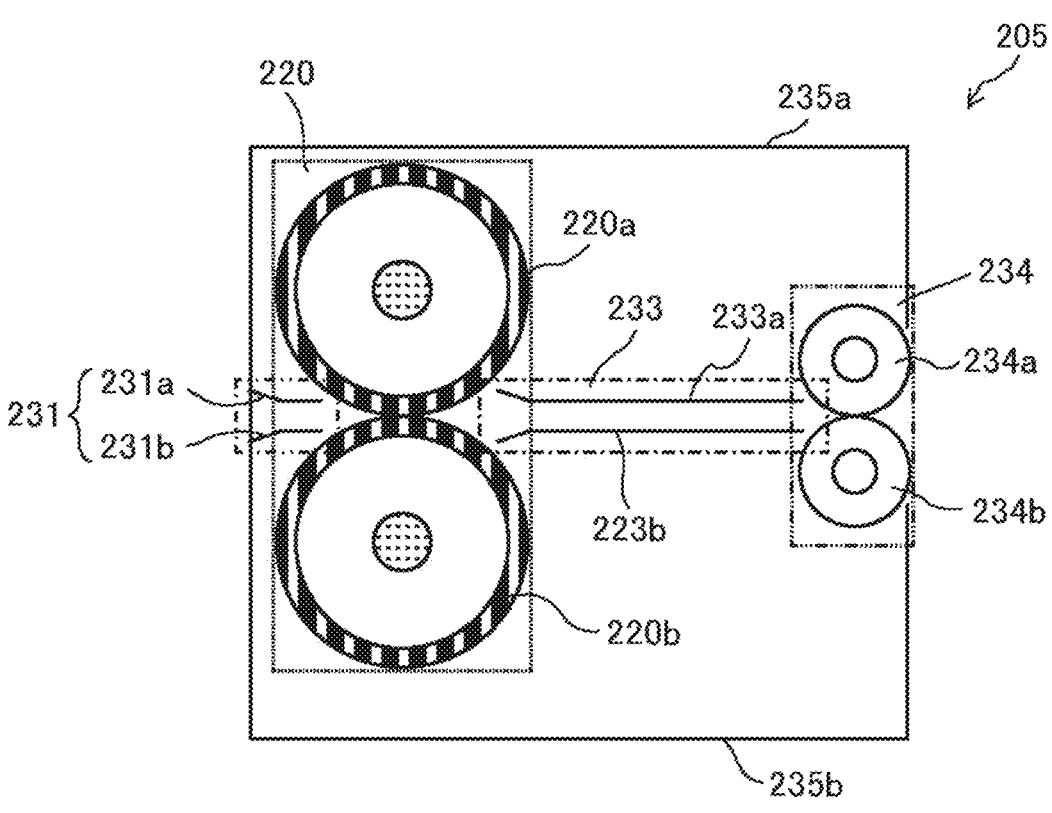
FIG. 19 is a schematic diagram illustrating a configuration of the laminate-fixing device of FIG. 18.

FIG. 18 is a front view illustrating a laminating system including a detachable laminate-fixing device, and FIG. 19 is a schematic diagram illustrating a configuration of the laminate-fixing device of FIG. 18.

The laminate-fixing device 205 of the present embodiment is disposed above the sheet separating device 203. By heating the heat pressing roller pair 220, even when heat is emitted from the laminate-fixing device 205, the heat moves upward, and thus, it is possible to suppress the thermal influence on other parts (the sheet separating device 203, etc.).

As illustrated in FIG. 19, the laminate-fixing device 205 includes a fixing entrance conveyor 231, a heat pressing roller pair 220, a fixing relay conveyor 233, a sheet ejection roller pair 234, a cover 235, a stay, and the like.

The fixing entrance conveyor 231 includes an upper and lower pair of a first fixing entrance conveyance member 231*a* and a second fixing entrance conveyance member 231*b*, and the heat pressing roller pair 220 includes an upper limit pair of a first heat pressing roller 220*a* and a second heat pressing roller 220*b*.

Further, the fixing relay conveyor 233 includes an upper and lower pair of a first fixing relay conveyance member 233*a* and a second fixing relay conveyance member 233*b*, and the sheet ejection roller pair 234 includes an upper and lower pair of a first sheet ejection roller 234*a* and a second sheet ejection roller 234*b*.

Furthermore, the cover 235 includes a pair of a first cover member 235*a* and a second cover member 235*b*, and the first and second cover members 235*a* and 235*b* are fixed so as to integrally unitize the heat pressing roller pair 220 and the like via a stay.

In particular, it is preferable to use a material having a high heat insulating effect for the cover 235 to suppress heat conduction from the heat pressing roller pair 220 to other members.

Next, a method for detaching the laminate-fixing device will be described.

Figure 20:
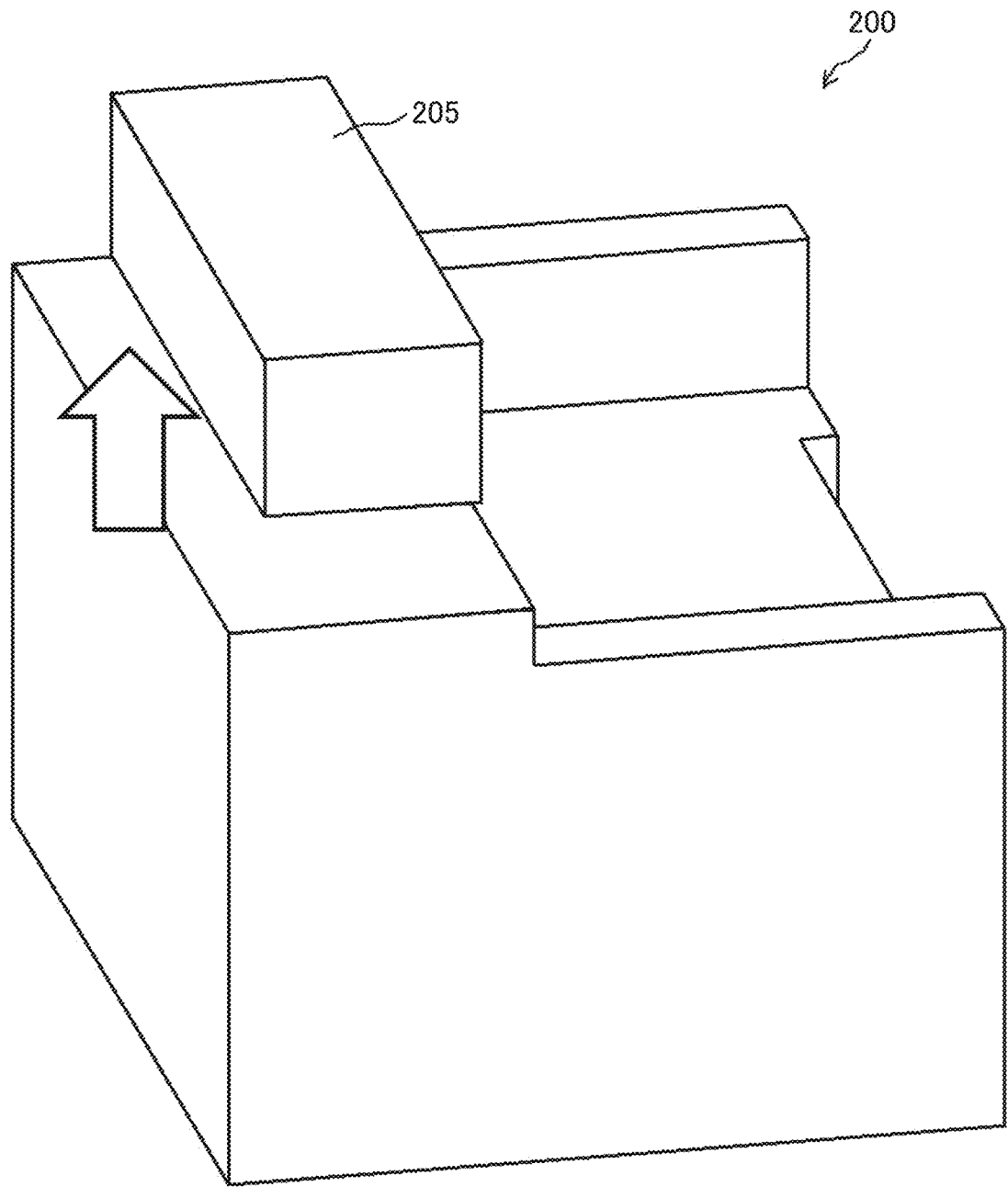
FIG. 20 is a schematic diagram illustrating a detachment direction of the laminate-fixing device.

FIG. 20 is a schematic diagram (part 1) illustrating a detachment direction of the laminate-fixing device. For example, as illustrated in FIG. 20, the unitized laminate-fixing device 205 can be removed by being lifted upward in the vertical direction by the user.

Figure 21:
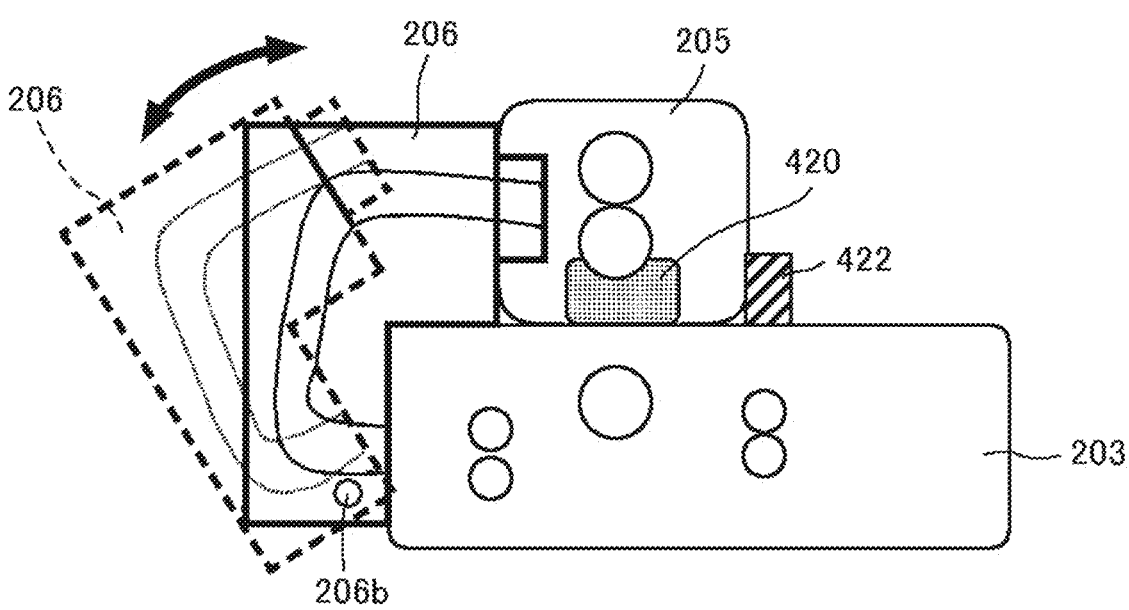
FIG. 21 is a schematic diagram illustrating a positioning configuration of the laminate-fixing device.

FIG. 21 is a schematic diagram illustrating a positioning configuration of the laminate-fixing device. As illustrated in FIG. 21, the conveyor 206 that conveys the sheet Sp to the laminate-fixing device 205 is rotatably disposed around a rotational fulcrum 206*b*, and has a configuration that can be coupled to and released from the laminate-fixing device 205. The laminate-fixing device 205 can be disposed at a predetermined position by positioning members 420 and 422 disposed in the sheet separating device 203.

Therefore, when the laminate-fixing device 205 is removed, the conveyor 206 is rotated to release the coupling to the laminate-fixing device 205, and then the laminate-fixing device 205 can be pulled upward. On the other hand, when the laminate-fixing device 205 is mounted, the laminate-fixing device 205 may be disposed from above the sheet separating device 203 while being positioned by the positioning members 420 and 422, and then the conveyor 206 may be coupled to the laminate-fixing device 205.

Figure 22:
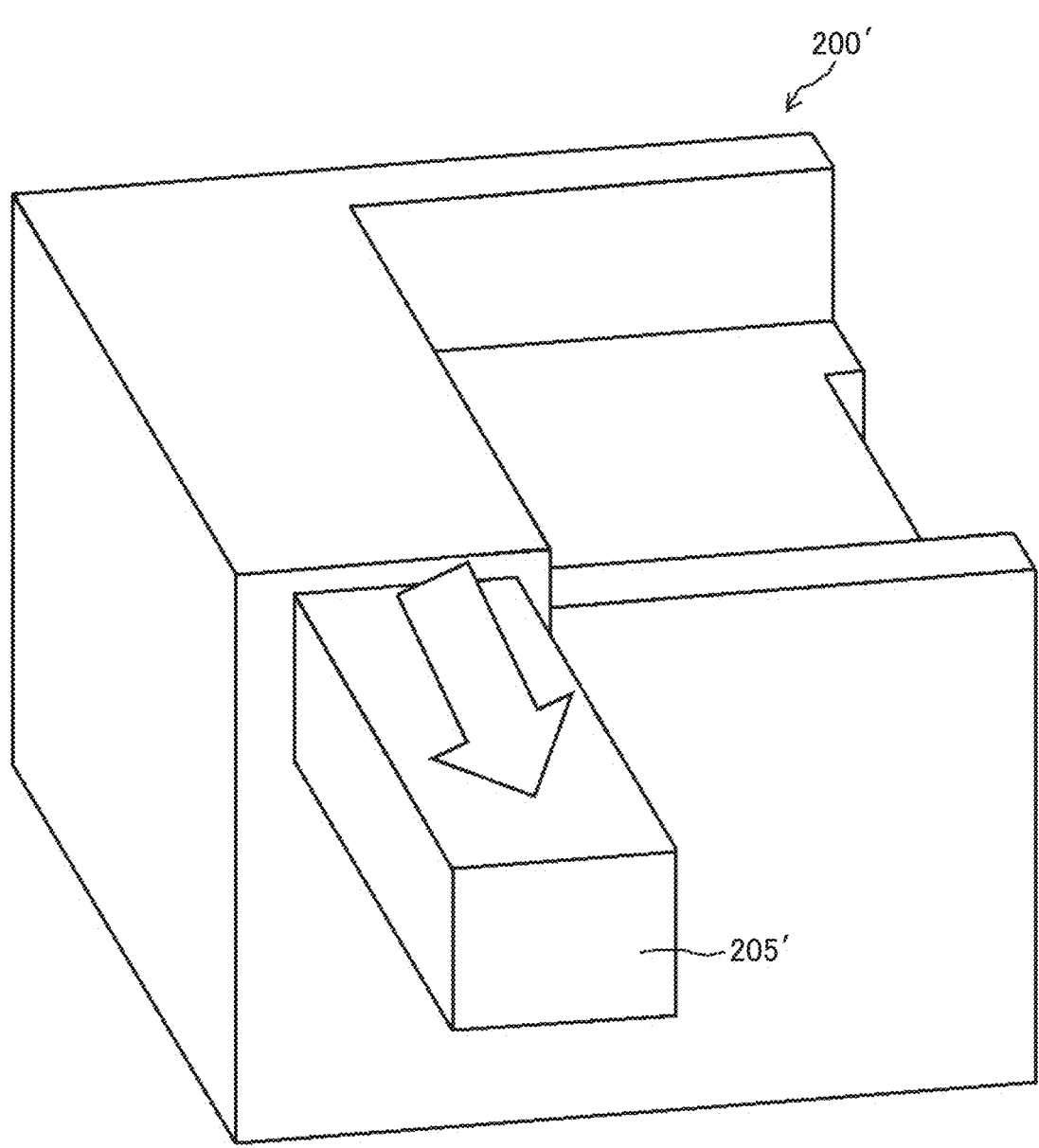
FIG. 22 is a schematic diagram illustrating a detachment direction of the laminate-fixing device.
Figure 23:
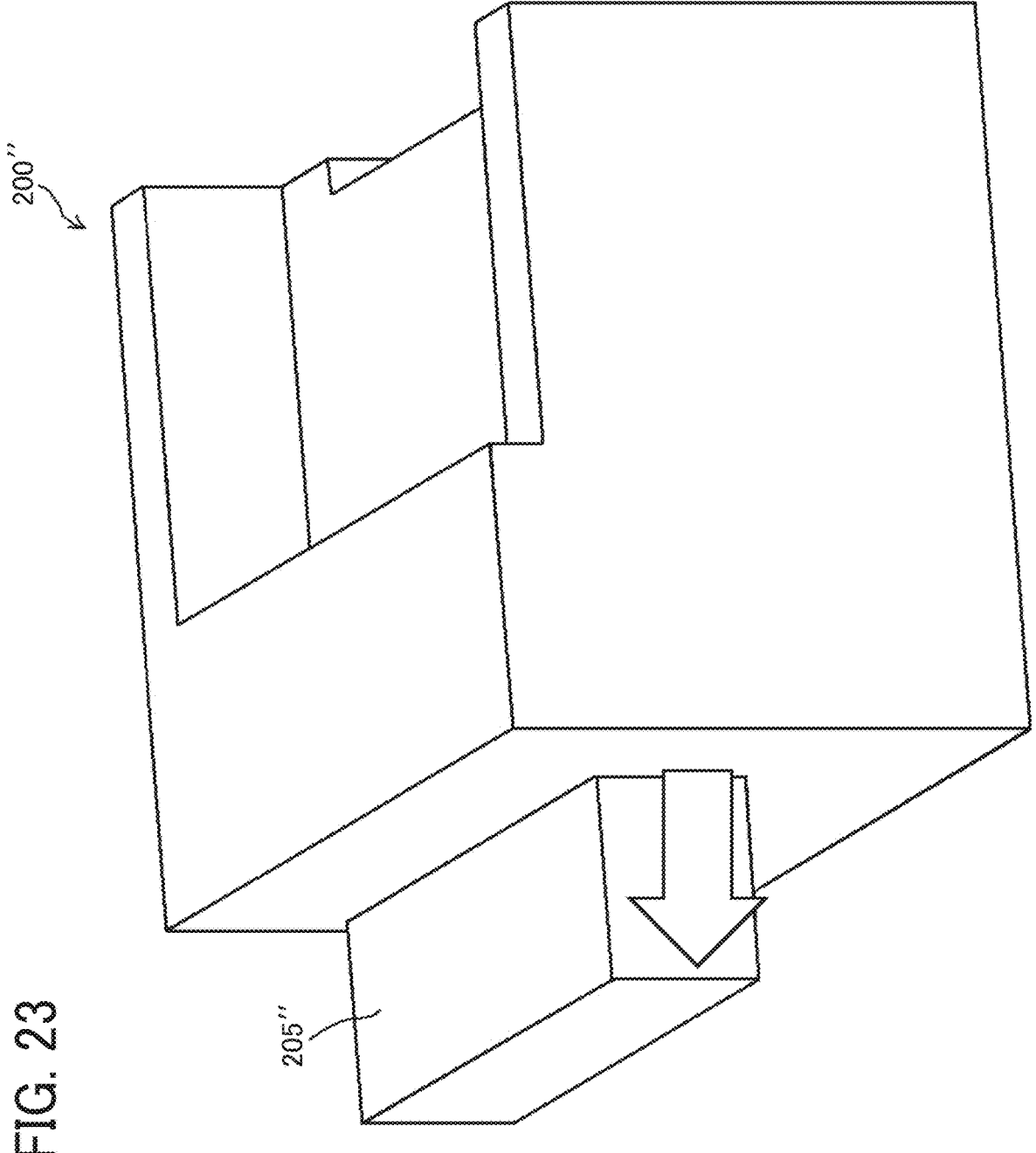
FIG. 23 is a schematic diagram illustrating a detachment direction of the laminate-fixing device.
Figure 24:
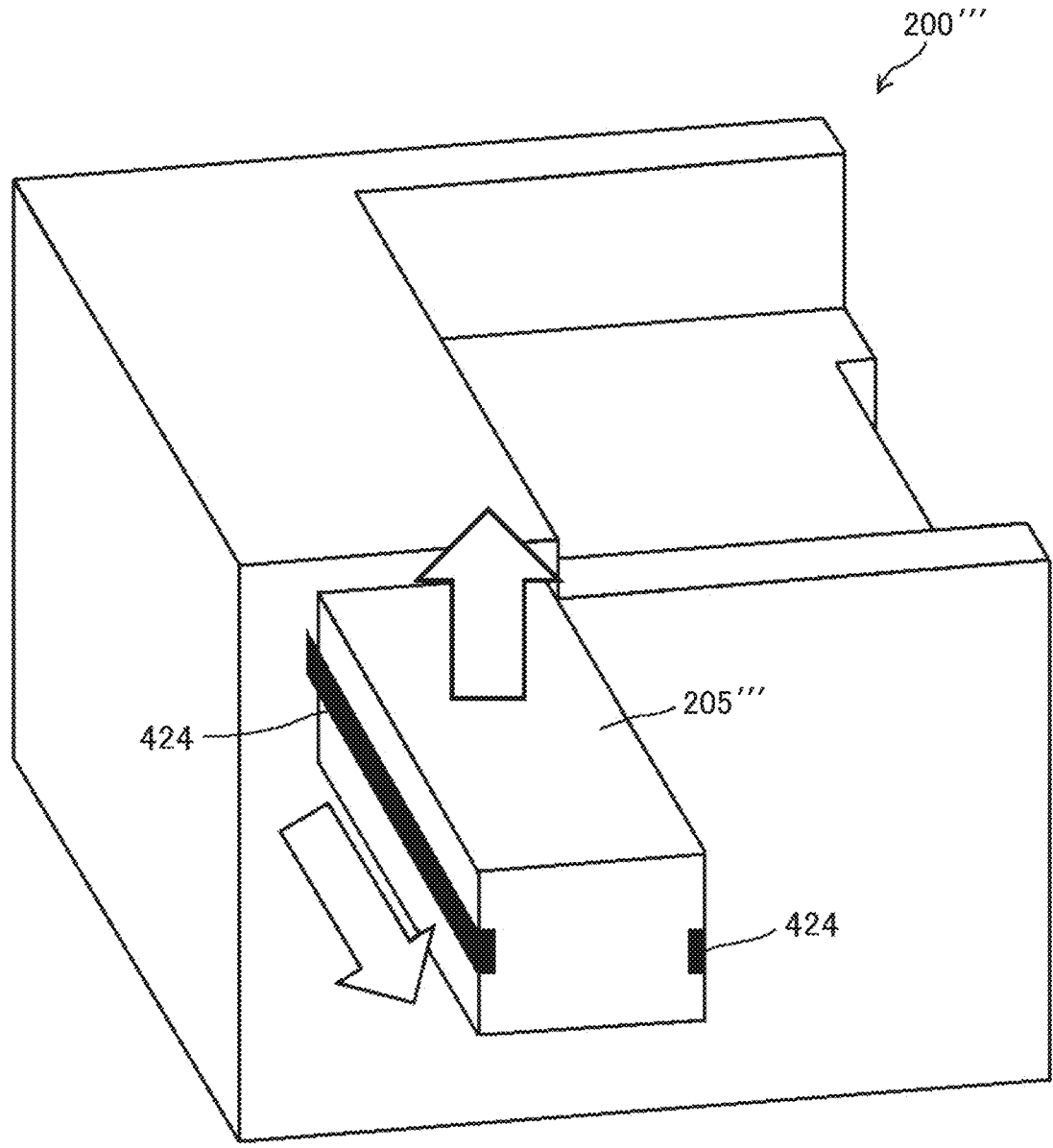
FIG. 24 is a schematic diagram illustrating a detachment direction of the laminate-fixing device.

FIGS. 22 to 24 are schematic diagrams (parts 2 to 4) illustrating the detachment direction of the laminate-fixing device. As the detachment direction, a laminate-fixing device 205' can be pulled out from the front face of the laminating system 200' (the front direction of the paper of FIG. 22), or the laminate-fixing device 205" can be pulled out from the left side face of the laminating system 200" (the left direction of the paper of FIG. 23).

However, in consideration of workability, it is preferable that the laminate-fixing devices 205' and 205" are as light as possible.

On the other hand, in the case of the laminate-fixing device 205''' having a large weight, as illustrated in FIG. 24, the laminate-fixing device can support and pull out the laminate-fixing device 205''' using a supporting member 424 such as a rail. Thus, even in the laminate-fixing device 205''' having a large weight, workability of detachment can be improved.

Next, an advantageous configuration of the present embodiment will be described.

Figures 25A, 25B:
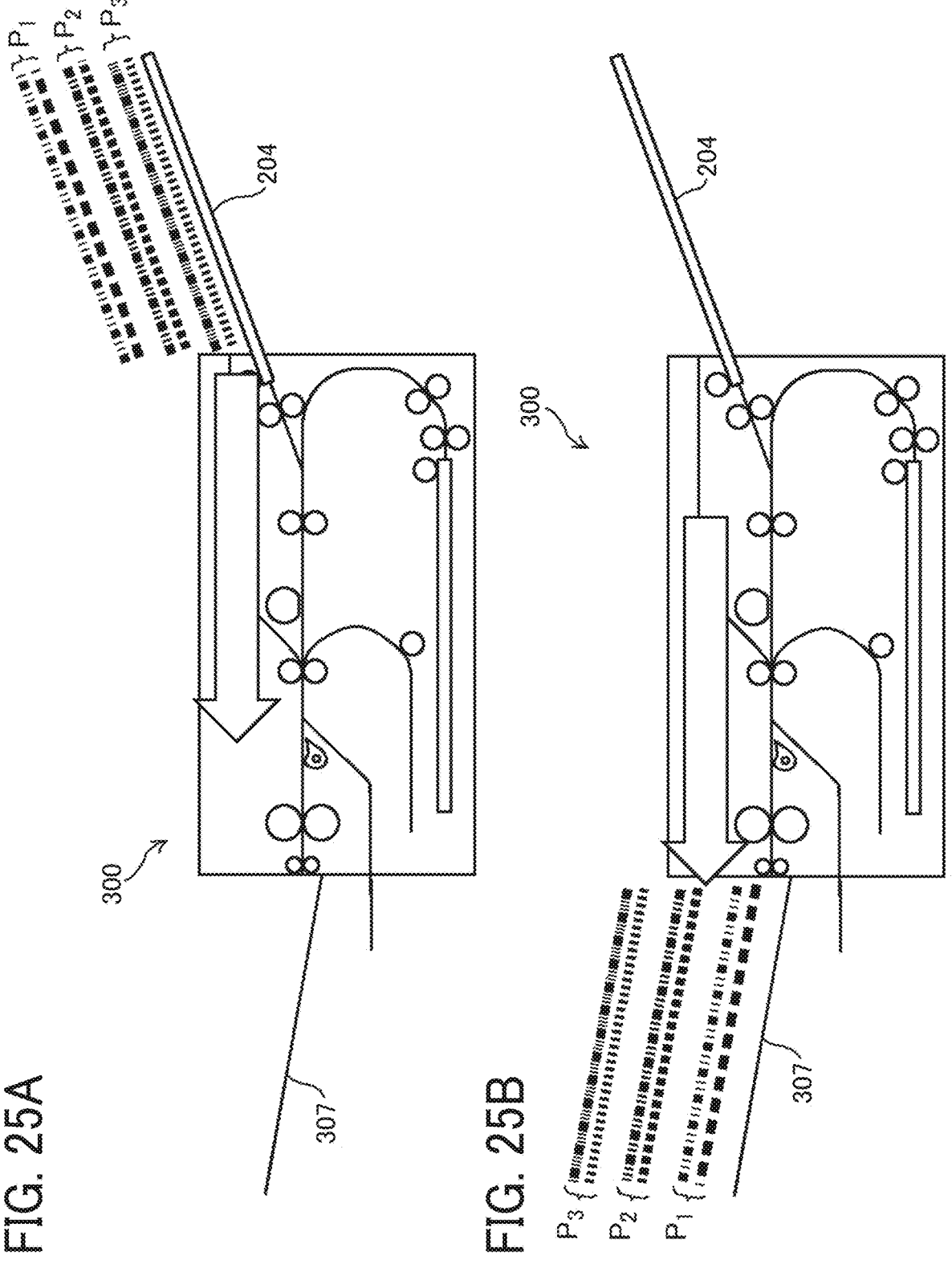
FIG. 25A is a schematic diagram of a laminating system that does not reverse an inner sheet, illustrating a state in which the inner sheet before being fed is stacked.
FIG. 25B is a schematic diagram of the laminating system illustrated in FIG. 25A, illustrating a state in which an ejected inner sheet is stacked.

FIGS. 25A and 25B are schematic diagrams illustrating output results in the laminating system in which the inner sheet is not reversed, wherein FIG. 25A illustrates a stacked state of the inner sheet before feeding, and FIG. 25B illustrates a stacked state of the inner sheet after ejection.

The laminating system 300 of FIGS. 25A and 25B is the same as that illustrated in FIG. 3 above, and the laminate-fixing device is disposed in the horizontal direction on the downstream side in the conveyance direction of the sheet separating device.

In the laminating system 300, when the inner sheets P stacked on the inner sheet feeder 204 are fed in the order of $P_1$, $P_2$, and $P_3$ from the top, the inner sheets P ejected and stacked on the output section 307 are in the order of $P_3$, $P_2$, and $P_1$ from the top, and are in the reverse order of the order before feeding. Furthermore, in a case where there is information on both faces of the inner sheet P and there is a relation to the page order, the pages are out of order. This is because the front and back sides of the inner sheet remain as they are at the beginning, and the user changes the page order separately.

Figure 26A:
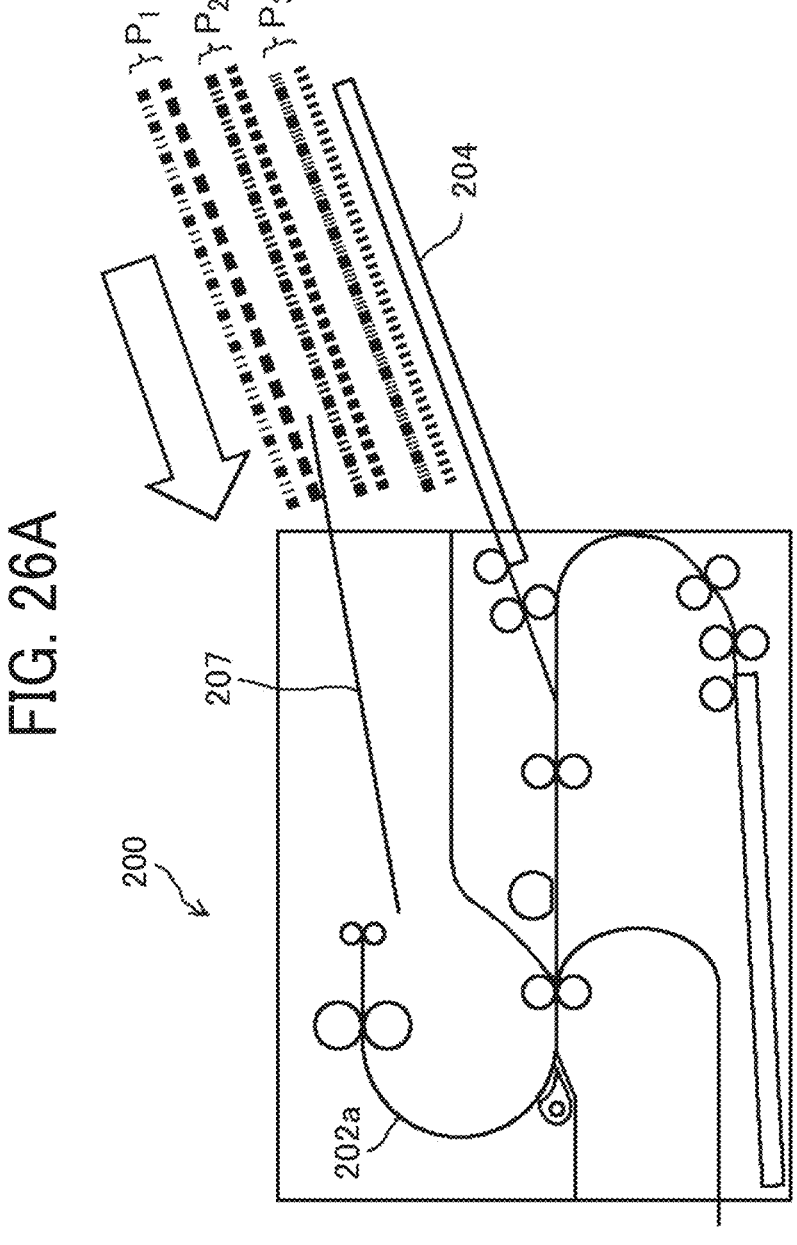
Figure 26B:
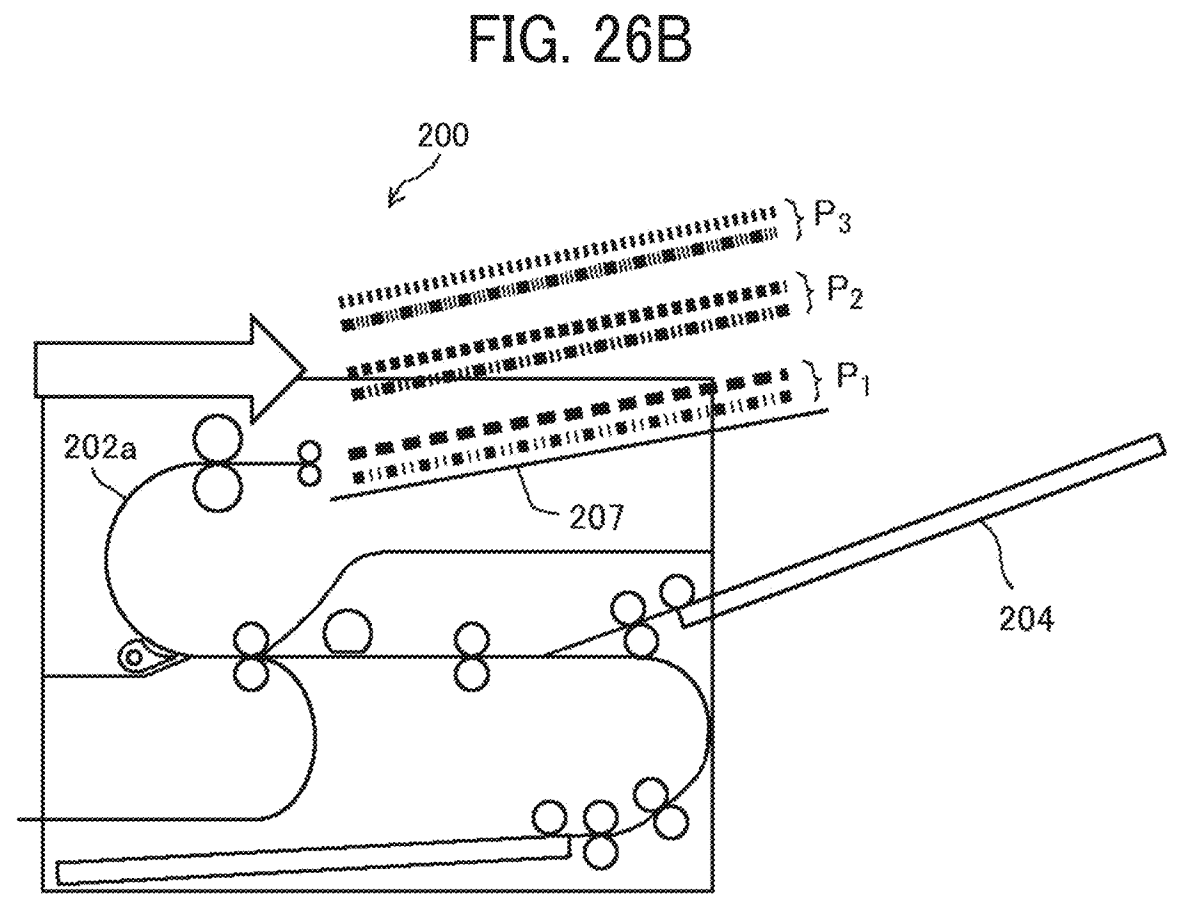

FIGS. 26A and 26B are schematic diagrams illustrating output results in the laminating system of the present embodiment, wherein FIG. 26A illustrates a stacked state of the inner sheet before feeding, and FIG. 26B illustrates a stacked state of the inner sheet after ejection.

In the laminating system 200 of the present embodiment, the inner sheet P is reversed by the reverse path 202*a*. When the inner sheets P stacked on the inner sheet feeder 204 are fed in the order of $P_1$, $P_2$, and $P_3$ from the top, the inner sheets P ejected and stacked on the output section 207 are in the order of $P_3$, $P_2$, and $P_1$ from the top, which is the same as FIGS. 25A and 25B in that the inner sheets P are in the reverse order of the order before feeding. However, since the front and back sides of the inner sheet P are reversed, in a case where information is on both faces of the inner sheet P and there is a relation to the page order, page forward feeding is performed. Therefore, it is not necessary for the user to change the page order, which is advantageous because labor is saved.

Figure 27:
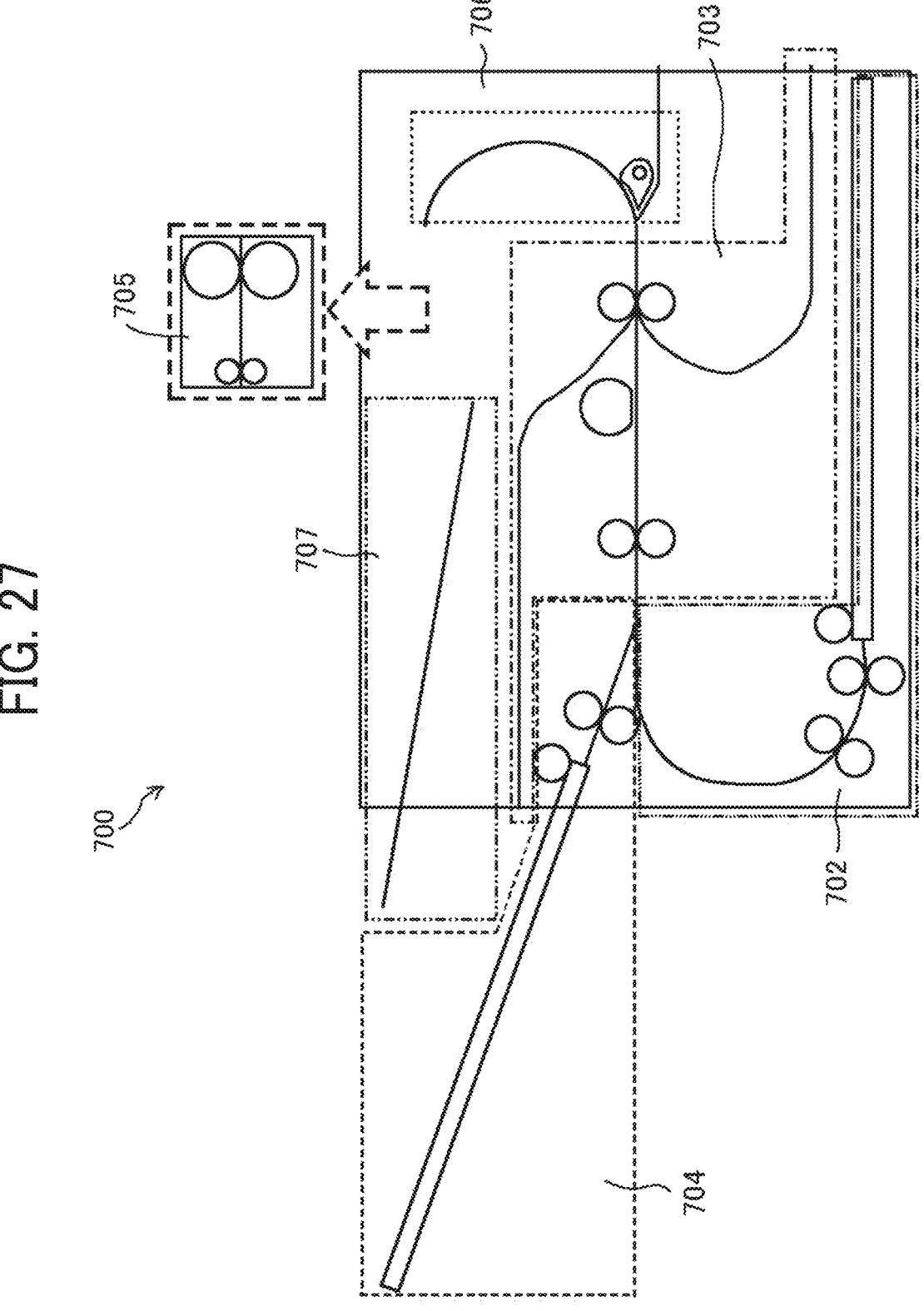
FIG. 27 is a front view of a laminating system including a detachable laminate-fixing device according to one embodiment of the present disclosure.

FIG. 27 is a front view (part 2) illustrating a laminating system including a detachable laminate-fixing device. A laminating system 700 has a horizontally reversed configuration with respect to the laminating system 200 of FIG. 18 (the same applies to a sheet feeder 702, a sheet separating device 703, an inner sheet feeder 704, a laminate-fixing device 705, an output section 707, and a conveyor 706). In this case, the feeding direction of the inner sheet P is from left to right when viewed from the front of the drawing. Even in such a configuration of reverse arrangement, the laminate-fixing device 705 can be detached similarly to that illustrated in FIG. 18.

Although the embodiments of the present disclosure have been described in detail above, the above-described embodiments are examples, and can be used with various modifications in a range of not departing from the gist. For example, embodiments and modifications may be combined with each other.

Aspects of the present disclosure are, for example, as follows.

Aspect 1

A laminating system for sandwiching a sheet medium in a two-ply sheet in which two sheets are overlapped and partially joined together and applying heat and pressure to bond the two-ply sheet. The laminating system includes: a sheet separating device to separate the two sheets of the two-ply sheet and sandwich the sheet medium between the two sheets; a laminate-fixing device to heat and press the two-ply sheet sandwiching the sheet medium; and a conveyor to convey the two-ply sheet sandwiching the sheet medium from the sheet separating device to the laminate-fixing device. The laminate-fixing device is disposed above the sheet separating device.

Aspect 2

In the laminating system according to Aspect 1, the conveyor includes a first branch conveyance path to reverse and convey the two-ply sheet sandwiching the sheet medium to the laminate-fixing device. A conveyance direction of the two-ply sheet in the laminate-fixing device is opposite to a conveyance direction of the two-ply sheet in the sheet separating device.

Aspect 3

The laminating system according to Aspect 1 or 2 further includes an output section disposed downstream from the laminate-fixing device in a conveyance direction of the two-ply sheet in the laminate-fixing device, the output section to receive the two-ply sheet having been laminated by the laminate-fixing device. The output section is disposed side by side with the laminate-fixing device in a horizontal direction. At least a part of the output section is disposed above the sheet separating device.

Aspect 4

The laminating system according to any one of Aspects 1 to 3, further including a sheet feeder to convey the two-ply sheet to the sheet separating device.

Aspect 5

In the laminating system according to Aspect 4, at least a part of the sheet feeder is disposed below the sheet separating device. The sheet feeder has a conveyance path to reverse and convey the two-ply sheet.

Aspect 6

The laminating system according to any one of Aspects 1 to 5 further includes an inner sheet feeder to convey the sheet medium to the sheet separating device. The inner sheet feeder is disposed in a horizontal direction with respect to the sheet separating device on an upstream side in a conveyance direction of the sheet separating device.

Aspect 7

In the laminating system according to Aspect 2, the conveyor includes a second branch conveyance path to temporarily accommodate the two-ply sheet and convey an unjoined end of the two-ply sheet to the sheet separating device. The conveyor switches a conveyance path of the two-ply sheet to either the first branch conveyance path or the second branch conveyance path.

Aspect 8

In the laminating system according to Aspect 7, the second branch conveyance path guides a leading end of the two-ply sheet to an outside of the laminating system.

Aspect 9

In the laminating system according to any one of Aspects 1 to 8, the sheet separating device includes: a first separator to guide one sheet of the two-ply sheet that has been separated; and a second separator to guide the other sheet of the two-ply sheet.

Aspect 10

In the laminating system according to Aspect 9, the second separator below the first separator has a reverse path, and the first separator and the second separator guide the one sheet and the other sheet of the two-ply sheet in different directions.

Aspect 11

In the laminating system according to Aspect 9 or 10, the one sheet and the other sheet of the two-ply sheet that has been separated are guided from a second branch conveyance path to the first separator and the second separator, respectively. Conveyance speeds of the one sheet and the other sheet of the two-ply sheet that has been separated are same.

Aspect 12

In the laminating system according to any one of Aspects 9 to 11, the second separator guides a leading end of the other sheet to an outside of the laminating system.

Aspect 13

In the laminating system according to any one of Aspects 1 to 12, the laminate-fixing device is detachable from the laminating system.

Aspect 14

In the laminating system according to any one of Aspects 1 to 13, the laminate-fixing device includes: a heat pressing roller pair; a cover covering the heat pressing roller pair; and a stay. The heat pressing roller pair and the cover are integrated with the stay as a single unit.

Aspect 15

In the laminating system according to any one of Aspects 1 to 14, a conveyance path of the laminate-fixing device is located at an uppermost position among conveyance paths in the laminating system, and the laminate-fixing device is detachable upward from the laminating system.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A laminating system for sandwiching a sheet medium in a two-ply sheet in which two sheets are overlapped and partially joined together and applying heat and pressure to bond the two-ply sheet, the laminating system comprising:
a sheet separating device configured to separate the two sheets of the two-ply sheet and sandwich the sheet medium between the two sheets;
a laminate-fixing device configured to heat and press the two-ply sheet sandwiching the sheet medium; and
a conveyor configured to convey the two-ply sheet sandwiching the sheet medium from the sheet separating device to the laminate-fixing device, the conveyor including a conveyance path configured to reverse and convey the two-ply sheet sandwiching the sheet medium to the laminate-fixing device, wherein
the laminate-fixing device is above the sheet separating device, and
a conveyance direction of the two-ply sheet in the laminate-fixing device is opposite to a conveyance direction of the two-ply sheet in the sheet separating device.

2. The laminating system according to claim 1, further comprising:
an output section downstream from the laminate-fixing device in the conveyance direction of the two-ply sheet in the laminate-fixing device, the output section configured to receive the two-ply sheet having been laminated by the laminate-fixing device,
wherein the output section is side by side with the laminate-fixing device in a horizontal direction, and
at least a part of the output section is above the sheet separating device.

3. The laminating system according to claim 1, further comprising a sheet feeder configured to convey the two-ply sheet to the sheet separating device.

4. The laminating system according to claim 3,
wherein at least a part of the sheet feeder is below the sheet separating device, and
the sheet feeder includes a sheet feeder conveyance path configured to reverse and convey the two-ply sheet.

5. The laminating system according to claim 1, further comprising:
an inner sheet feeder configured to convey the sheet medium to the sheet separating device,
wherein the inner sheet feeder is in a horizontal direction with respect to the sheet separating device on an upstream side in the conveyance direction of the sheet separating device.

6. The laminating system according to claim 1, wherein the conveyor includes another conveyance path configured to temporarily accommodate the two-ply sheet and convey an unjoined end of the two-ply sheet to the sheet separating device, and
the conveyor is further configured to switch a current conveyance path of the two-ply sheet to either the conveyance path or the another conveyance path.

7. The laminating system according to claim 6,
wherein the another conveyance path is further configured to guides a leading end of the two-ply sheet to an outside of the laminating system.

8. The laminating system according to claim 1, wherein the sheet separating device includes:

a first separator configured to guide one sheet of the two-ply sheet that has been separated; and
a second separator configured to guide an other sheet of the two-ply sheet.

9. The laminating system according to claim 8, wherein the second separator is below the first separator and includes a reverse path; and
the first separator and the second separator are configured to guide the one sheet and the other sheet in different directions.

10. The laminating system according to claim 8,
wherein the one sheet and the other sheet of the two-ply sheet that have been separated are guided from another conveyance path to the first separator and the second separator, respectively, and conveyance speeds of the one sheet and the other sheet of the two-ply sheet that have been separated are the same.

11. The laminating system according to claim 8,
wherein the second separator is configured to guides a leading end of the other sheet to outside of the laminating system.

12. The laminating system according to claim 1,
wherein the laminate-fixing device is configured to be detachable from the laminating system.

13. The laminating system according to claim 1, wherein the laminate-fixing device includes:
a heat pressing roller pair; and
a cover configured to cover the heat pressing roller pair.

14. The laminating system according to claim 1,
wherein a laminate-fixing conveyance path of the laminate-fixing device is at an uppermost position among a plurality of conveyance paths in the laminating system, and the laminate-fixing device is configured to be detachable in an upward direction from the laminating system.

15. The laminating system according to claim 13, wherein the heat pressing roller pair is configured to:
melt an adhesive applied to the two-ply sheet.

16. The laminating system according to claim 15, further comprising:
an ejection roller pair configured to convey the two-ply sheet from the heat pressing roller pair to an output section.

17. The laminating system according to claim 16, wherein the ejection roller pair is configured to have a faster linear velocity than the heat pressing roller pair.

18. The laminating system according to claim 17, wherein the output section includes a sheet ejection tray, the sheet ejection tray configured to be inclined and exposed to outside of the laminating system.

19. The laminating system according to claim 5, further comprising:
an entrance roller pair configured to convey the sheet medium from the inner sheet feeder to an exit roller pair,
wherein the exit roller pair is configured to insert the sheet medium between the two sheets of the two-ply sheet that have been separated.

20. A system comprising:
a laminate-fixing device configured to,
sandwich a sheet medium into a two-ply sheet, the two-ply sheet including two sheets which are overlapped and partially joined together, and
apply heat and pressure to bond the two-ply sheet;
a sheet separating device configured to separate the two sheets of the two-ply sheet and sandwich the sheet medium between the two sheets; and a conveyor configured to convey the two-ply sheet sandwiching the sheet medium from the sheet separating device to the laminate-fixing device, the conveyor including a conveyance path configured to reverse and convey the two-ply sheet sandwiching the sheet 5 medium to the laminate-fixing device, wherein the laminate-fixing device is above the sheet separating device, and a conveyance direction of the two-ply sheet in the laminate-fixing device is opposite to a conveyance direction 10 of the two-ply sheet in the sheet separating device.

* * * * *